(12) United States Patent
Yamaguchi et al.

(10) Patent No.: US 9,736,386 B2
(45) Date of Patent: Aug. 15, 2017

(54) CONTROL DEVICE, CONTROL METHOD, AND EXPOSURE CONTROL SYSTEM

(71) Applicant: Sony Corporation, Tokyo (JP)

(72) Inventors: Motoshi Yamaguchi, Kanagawa (JP); Daisuke Kasai, Tokyo (JP)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 14/528,181

(22) Filed: Oct. 30, 2014

(65) Prior Publication Data
US 2015/0181095 A1 Jun. 25, 2015

(30) Foreign Application Priority Data

Dec. 25, 2013 (JP) ................................. 2013-266830

(51) Int. Cl.
*H04N 5/235* (2006.01)
*H04N 5/232* (2006.01)
(52) U.S. Cl.
CPC ........... *H04N 5/235* (2013.01); *H04N 5/2352* (2013.01); *H04N 5/23212* (2013.01)
(58) Field of Classification Search
CPC ............. H04N 5/23212; H04N 5/2356; H04N 5/2351; H04N 5/2353; H04N 5/235
See application file for complete search history.

(56) References Cited

U.S. PATENT DOCUMENTS

| 2004/0150724 A1* | 8/2004 | Nozaki | H04N 1/00347 348/211.4 |
| 2007/0216958 A1* | 9/2007 | Narukawa | H04N 1/00477 358/302 |
| 2011/0058070 A1* | 3/2011 | Awazu | H04N 5/23212 348/241 |

FOREIGN PATENT DOCUMENTS

| JP | 2008-134389 A | 6/2008 |
| JP | 2008-300931 A | 12/2008 |

* cited by examiner

*Primary Examiner* — Lin Ye
*Assistant Examiner* — Chriss Yoder, III
(74) *Attorney, Agent, or Firm* — Michael Best & Friedrich LLP

(57) ABSTRACT

There is provided a control device including a control unit configured to perform exposure control of a first pixel group and exposure control of a second pixel group independently of each other, the first pixel group and the second pixel group being disposed in a single imaging surface. The control unit controls gain or an exposure time of the first pixel group and gain or an exposure time of the second pixel group independently of each other.

16 Claims, 14 Drawing Sheets

CONTROL DEVICE, CONTROL METHOD, AND EXPOSURE CONTROL SYSTEM

CROSS REFERENCE TO RELATED APPLICATIONS

This application claims the benefit of Japanese Priority Patent Application JP 2013-266830 filed Dec. 25, 2013, the entire contents of which are incorporated herein by reference.

BACKGROUND

The present disclosure relates to control devices, control methods, and exposure control systems.

In recent years, an imaging apparatus, such as a digital camera, equipped with an imaging element having a plurality of photo-electric converters and in which the pixels thereof are divided is becoming widely available. By using such an imaging element, a phase-difference-detection autofocus (sometimes referred to as "phase-difference AF" hereinafter) mode that allows for high-speed autofocusing becomes possible.

For example, JP 2008-134389A discloses a method for controlling an imaging apparatus that uses an imaging element including phase-difference AF pixels and normal pixels. In JP 2008-134389A, phase-difference AF is performed by using the phase-difference AF pixels, whereas contrast autofocus (AF), live-view display, an automatic exposure (AE) process, and an auto-white-balance (AWB) process are performed by using the normal pixels.

JP 2008-300931A discloses a technology that compensates for storage time by performing specific gain correction on each line within an AF frame when the AF frame and a monitor-display frame are alternately read for improving both monitor image quality and focus precision. This avoids a situation where the storage time within the frame becomes uneven, and appropriate exposure is obtained for both the AF frame and the monitor-display frame.

SUMMARY

However, although JP 2008-134389A and JP 2008-300931A each have a description related to controlling the phase-difference pixels and monitor pixels independently of each other, there is no detailed disclosure of an idea of how control values for the phase-difference pixels and the monitor pixels are to be selected for achieving optimal AE-performance/AF-performance.

Therefore, for example, for the monitor pixels, it is difficult to significantly reduce the shutter speed (SS) or to set an international-organization-for-standardization (ISO) value (i.e., gain) to a high value to show a sharp and smooth image to a photographer. In particular, when the shutter speed and the ISO value are set to fixed values, an interlocking range of the monitor pixels becomes narrow. Thus, when the control values for the monitor pixels are identically applied to the phase-difference pixels, it is difficult to obtain sufficient brightness, thus making it difficult to achieve sufficient AF performance. Furthermore, the monitor pixels are smoothed so as not to show, for example, hunting for photographic exposure. Therefore, when autofocusing is performed by using an exposure value identical to that for a monitor image, it takes a long time to reach appropriate exposure.

When exposure correction is applied to the monitor pixels, the screen may become too dark or too bright. In this case, when exposure correction applied to the monitor pixels is identically applied to the phase-difference pixels, the AF performance deteriorates. When ultimate control values are set based on the monitor pixels, proper photometry is not achieved if the monitor pixels are not maintained at appropriate values, thus making it difficult to perform control in accordance with an exposure correction value set based on the ultimate control values.

Furthermore, in an aperture-value setting process, there is a case where it is difficult to select an aperture value identical to that for capturing when controlling the monitor pixels even during an aperture priority mode (A) or a manual mode (M) due to restrictions of, for example, AF control. When performing a preview, there is a restriction that it is difficult to perform autofocus.

Therefore, there is a demand for a control method that realizes more optimal AE-performance/AF-performance when independently controlling a first pixel group and a second pixel group that are disposed in a single imaging surface, like the phase-difference pixels and the monitor pixels.

According to an embodiment of the present disclosure, there is provided a control device including a control unit configured to perform exposure control of a first pixel group and exposure control of a second pixel group independently of each other, the first pixel group and the second pixel group being disposed in a single imaging surface. The control unit controls gain or an exposure time of the first pixel group and gain or an exposure time of the second pixel group independently of each other.

According to an embodiment of the present disclosure, there is provided a control method including controlling first gain or a first exposure time of a first pixel group, and controlling second gain or a second exposure time of a second pixel group independently of the first pixel group, the first pixel group and the second pixel group being disposed in a single imaging surface.

According to an embodiment of the present disclosure, there is provided an exposure control system including a first pixel group and a second pixel group configured to be disposed in a single imaging surface, and a control device having a control unit configured to perform exposure control of a first pixel group and exposure control of a second pixel group independently of each other, the control unit controlling gain or an exposure time of the first pixel group and gain or an exposure time of the second pixel group independently of each other.

According to one or more of embodiments of the present disclosure, the gain or the exposure time of the first pixel group and the gain or the exposure time of the second pixel group are controlled independently of each other. Thus, appropriate exposure can be set for each of the first pixel group and the second pixel group.

According to one or more of embodiments of the present disclosure described above, with regard to the first pixel group and the second pixel group that are disposed in a single imaging surface, the gain or the exposure time of the first pixel group and the gain or the exposure time of the second pixel group can be controlled independently of each other, thereby allowing for enhanced AF performance. The above-described advantage is not necessarily limitative. In addition to or in place of the above-described advantage, any of advantages described in this specification or another advantage obvious from this specification may be exhibited.

DETAILED DESCRIPTION OF THE EMBODIMENT(S)

Figure 1:
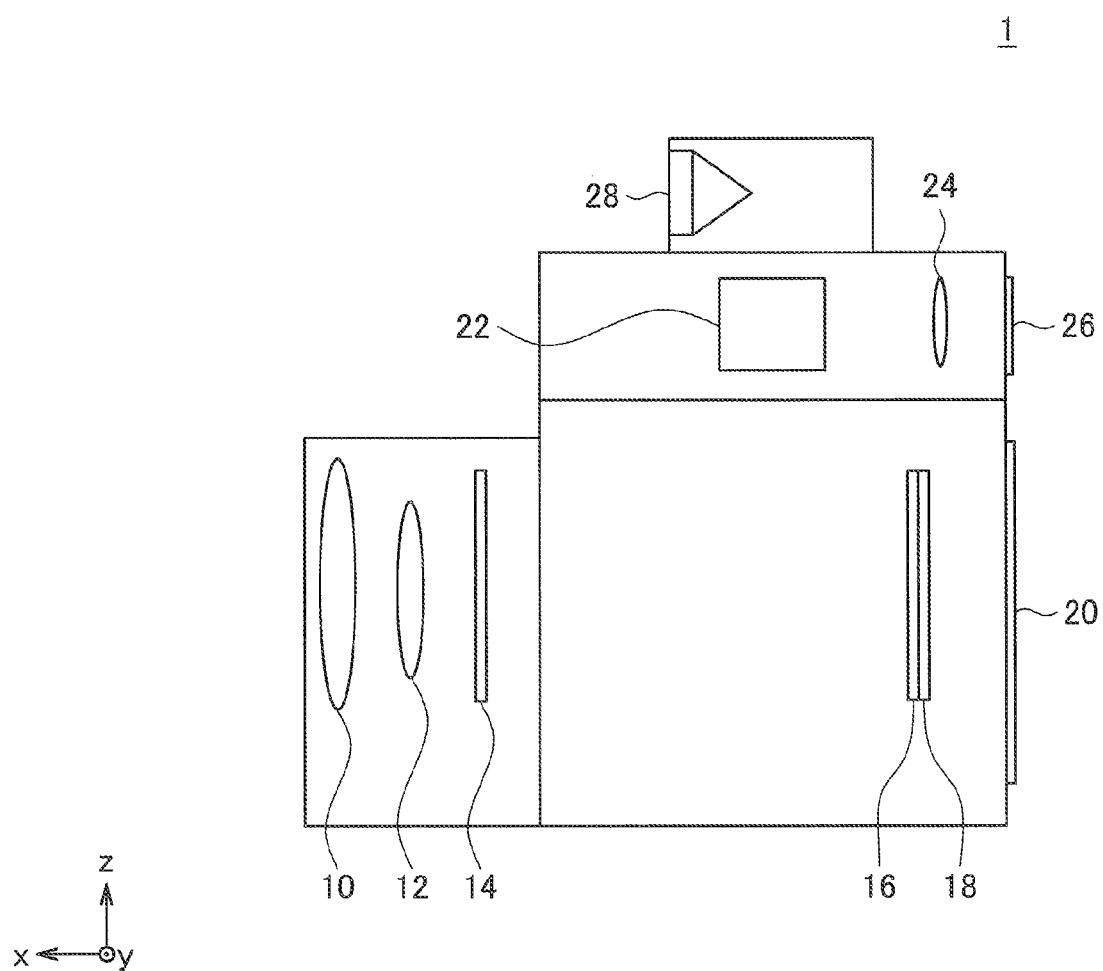
FIG. 1 is a cross-sectional view schematically illustrating a physical configuration of a digital camera including a control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 2:
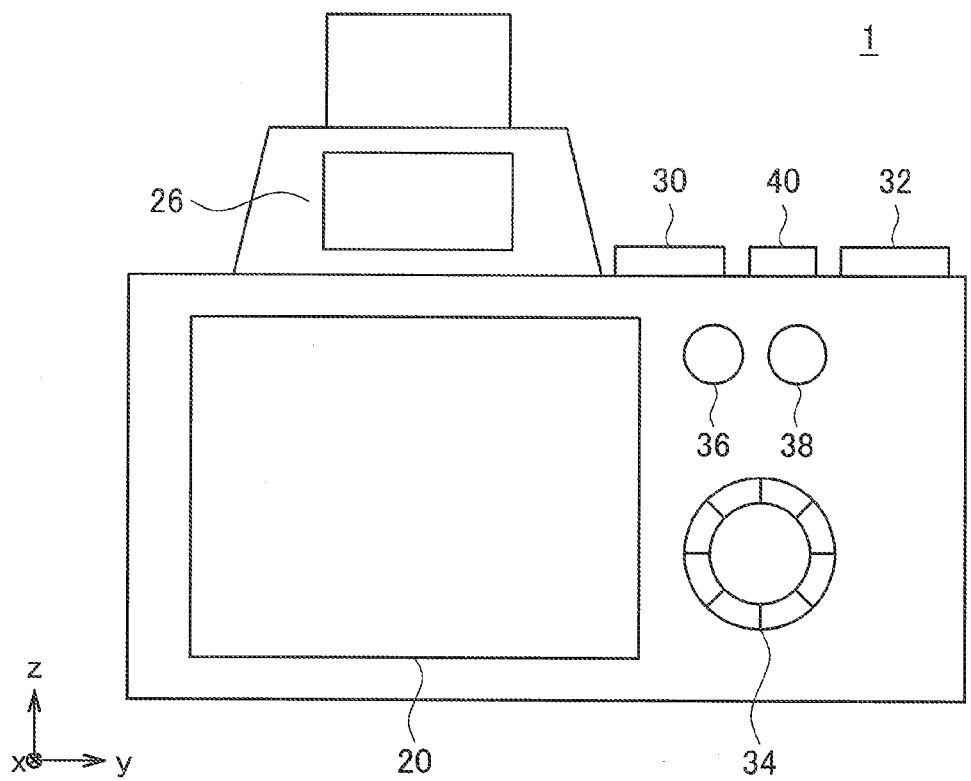
FIG. 2 is a rear view of the digital camera according to the embodiment.
Figure 3:
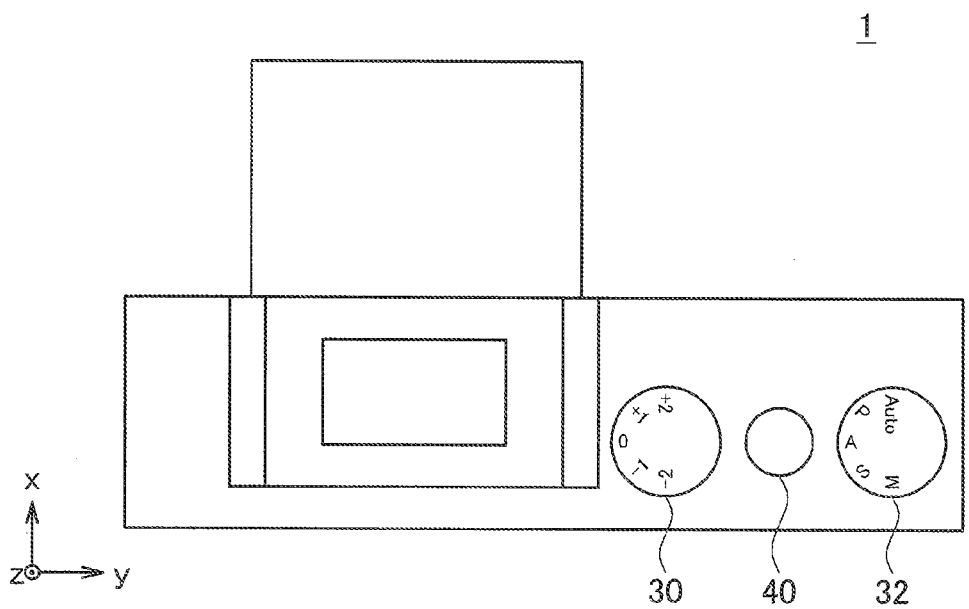
FIG. 3 is a plan view of the digital camera according to the embodiment.

The description below will proceed in the following order.
1. Schematic Configuration of Imaging Apparatus
2. Functional Configuration of Control Device
3. Exposure Control Process by Control Device
4. Modifications
    4.1. Exposure Correction by User
    4.2. Calculation of Control Values Based on AF/MF Mode
5. Hardware Configuration
1. Schematic Configuration of Imaging Apparatus First, a schematic configuration of an imaging apparatus equipped with a control device according to an embodiment of the present disclosure will be described. The imaging apparatus according to this embodiment is an imaging apparatus equipped with two imaging elements in a single imaging surface and is, for example, a digital camera 1 as shown in FIGS. 1 to 3. FIG. 1 is a cross-sectional view schematically illustrating a physical configuration of the digital camera 1 including the control device according to this embodiment. FIG. 2 is a rear view of the digital camera 1. FIG. 3 is a plan view of the digital camera 1.

The digital camera 1 is constituted of a lens unit, a main camera unit, and a flash unit. As shown in FIG. 1, the lens unit includes a photographic lens 10, a focusing lens 12, and a diaphragm 14. The main camera unit includes a photographic pixel group 16, a phase-difference detection pixel group 18, a liquid-crystal display (LCD) monitor 20, an electronic viewfinder (EVF) 22, an ocular lens 24, and a finder 26. The flash unit includes a light-emitting unit 28 and a light-emission control unit (not shown). Furthermore, as shown in FIGS. 2 and 3, the main camera unit includes an exposure correction dial 30, a photographic mode dial 32, an LCD-monitor operating dial 34, a preview button 36, an autofocus/manual-focus (AF/MF) switch button 38, and a shutter button 40.

The photographic lens 10 is an optical system that takes in light from a subject and projects a subject image onto the imaging elements.

The focusing lens 12 is an optical system that performs focus control of the subject image. For example, the focusing lens 12 is moved in an optical-axis direction (i.e., an X-axis direction) by a focusing-lens driving mechanism (not shown) that moves the focusing lens 12. The focusing-lens driving mechanism operates based on driving command information from the control device and moves the focusing lens 12. A focal point of the subject image can be controlled by the focusing lens 12 in this manner.

The diaphragm 14 adjusts the quantity of light taken in from the subject through the photographic lens 10 based on a control value set by a control device 100-1. For example, the diaphragm 14 is constituted of a plurality of diaphragm blades and is driven by a diaphragm mechanism (not shown) that moves the diaphragm blades. The diaphragm mechanism moves the diaphragm blades based on an f-number set by the control device 100-1 so that the quantity of light taken in from the subject can be adjusted.

The photographic pixel group 16 performs photo-electric conversion on the light taken in from the subject through the photographic lens 10. For example, the photographic pixel group 16 may be a solid-state imaging element, such as a complementary metal oxide semiconductor (CMOS) or a charge-coupled device (CCD).

The phase-difference detection pixel group 18 is a pixel group in which an optical-path direction of the light taken in from the subject through the photographic lens 10 is controlled. For example, micro-lenses corresponding to pixels in the phase-difference detection pixel group 18 may be arranged such that the center positions of the micro-lenses are not aligned with the center positions of the pixels. The photographic pixel group 16 and the phase-difference detection pixel group 18 are disposed in a single imaging surface. For example, the pixels in the photographic pixel group 16 may be arranged in odd-numbered rows, whereas the pixels in the phase-difference detection pixel group 18 may be arranged in even-numbered rows.

The LCD monitor 20 displays an image acquired by imaging as well as a stored image. Furthermore, the LCD monitor 20 displays an image used for setting, for example, a photographing method of the digital camera 1. For example, the LCD monitor 20 may be a liquid-crystal panel or an organic electroluminescence (EL) panel. Alternatively, the LCD monitor 20 may be a touch-screen.

The EVF 22 shows the image acquired by imaging. Specifically, the EVF 22 sequentially acquires an electric signal photo-electrically converted by the photographic pixel group 16 from the photographic pixel group 16 and projects an image based on the acquired electric signal onto the finder 26 via the ocular lens 24. For example, the EVF 22 may display the image acquired from the photographic pixel group 16 in real time.

The ocular lens 24 expands the image shown by the EVF 22.

The finder 26 is an eyepiece used by a user for checking the image shown by the EVF 22. The user can check a sequentially-imaged subject by looking into the finder 26.

The light-emitting unit 28 emits light in accordance with a light-emission quantity and a light-emission timing set by the light-emission control unit.

The light-emission control unit controls the light-emission quantity and the light-emission timing of the light-emitting unit 28 based on control values set by the control device 100-1. For example, the light-emission control unit controls pre-light emission and main light emission.

The exposure correction dial 30 is used for setting the degree of correction of an exposure control value during imaging. For example, if an image acquired by imaging is to be made brighter, the dial is set by being turned toward the positive side, or if the image is to be made darker, the dial is set by being turned toward the negative side. Exposure control related to correction may involve controlling of the gain, the exposure time, the aperture, or a combination thereof.

The photographic mode dial 32 is used for setting an exposure control mode. For example, the mode may be an auto mode (Auto), a program mode (P), an aperture priority mode (A), a shutter-speed priority mode (S), and a manual exposure mode (M). The auto mode and the program mode are modes in which the digital camera 1 automatically performs exposure control. The aperture priority mode is a mode in which an aperture value is set by the user and the aperture value is automatically controlled. The shutter-speed priority mode is a mode in which the exposure time is set by the user and the aperture value is automatically controlled. The manual exposure mode is a mode in which the aperture value and the exposure time are set by the user. By rotating the photographic mode dial 32 to set a desired mode to a preset position, the mode can be set.

The LCD-monitor operating dial 34 is used for operating an image displayed on the LCD monitor 20. Specifically, the user manipulates the LCD-monitor operating dial 34 to operate the image displayed on the LCD monitor 20 so as to perform, for example, setting operation of the digital camera 1.

The preview button 36 is used for setting whether or not to execute a preview. Specifically, the digital camera 1 transitions to a preview execution mode when the preview button 36 is pressed, and then transitions to a preview non-execution mode when the preview button 36 is pressed again. A preview in this case is, for example, displaying, on the LCD monitor 20 and the EVF 22, an image obtained when an image acquired from the photographic pixel group 16 in real time is exposure-controlled based on a set exposure control value.

The AF/MF switch button 38 is used for switching a focus setting of the digital camera 1 to autofocus or manual focus. Every time the AF/MF switch button 38 is pressed, the focus setting is switched between autofocus and manual focus.

The shutter button 40 is an operable section used for causing the digital camera 1 to execute an autofocusing (AF) process or an imaging process. Specifically, the AF process is executed when the shutter button 40 is half-pressed, and the imaging process is executed when the shutter button 40 is fully pressed.

Although not shown in FIGS. 1 to 3, the digital camera 1 includes the control device 100-1 constituted of, for example, a central processing unit (CPU) and a memory. Although an example in which the control device 100-1 is included in the digital camera 1 is described, the control device 100-1 may be included in, for example, an electronic apparatus, such as a smartphone, a tablet terminal, or a notebook-type personal computer.

2. Functional Configuration of Control Device

Figure 4:
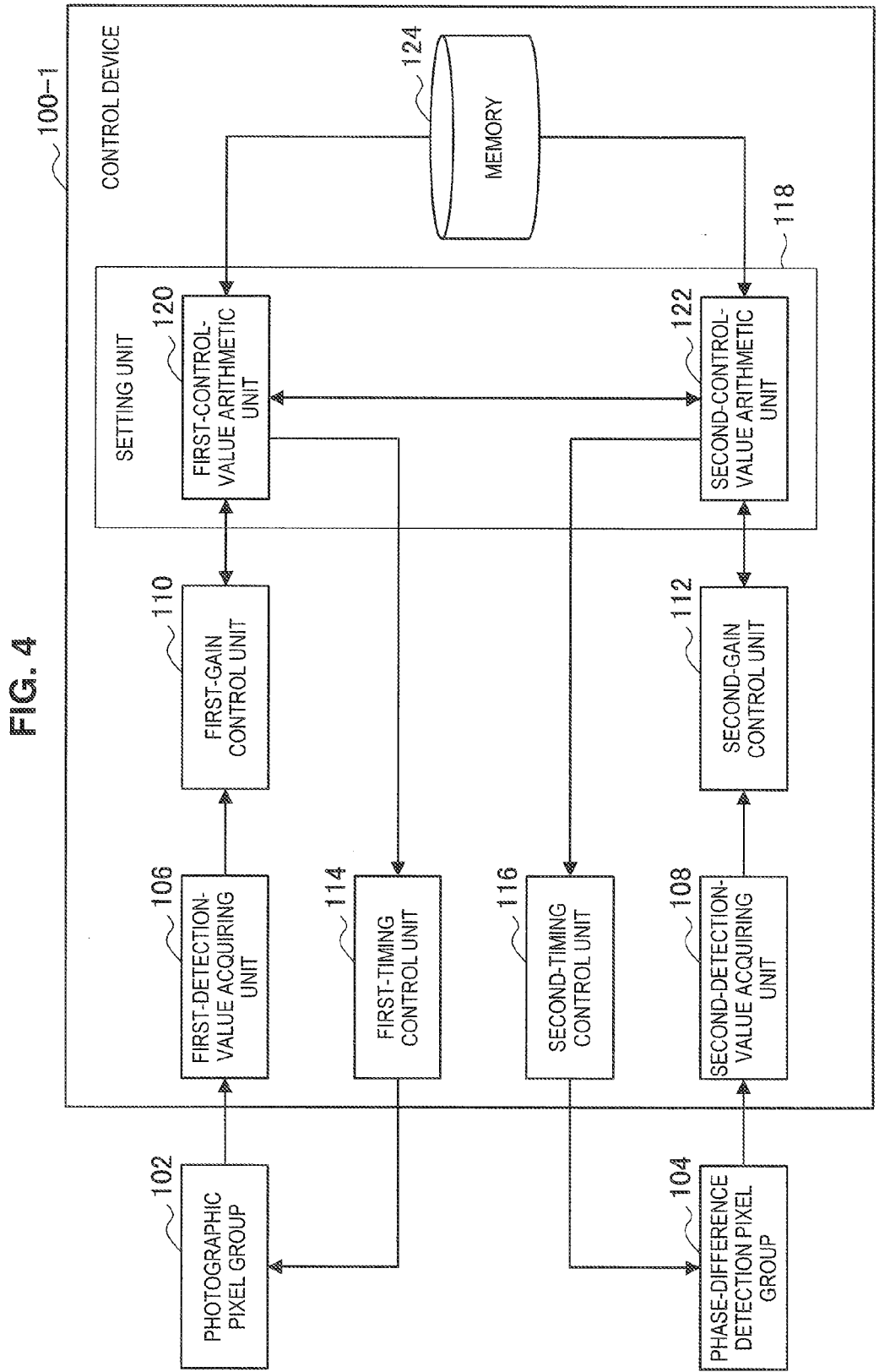
FIG. 4 is a block diagram schematically illustrating a functional configuration of the control device according to the embodiment.

Next, a functional configuration of the control device 100-1 according to this embodiment will be described with reference to FIG. 4. FIG. 4 is a block diagram schematically illustrating the functional configuration of the control device 100-1 according to this embodiment.

The control device 100-1 is a controller that performs exposure control of a photographic pixel group (first pixel group) 102 and exposure control of a phase-difference detection pixel group (second pixel group) 104, which are disposed in a single imaging surface, independently of each other. The control device 100-1 controls the gain or the exposure time of the photographic pixel group (first pixel group) 102 and the gain or the exposure time of the phase-difference detection pixel group (second pixel group) 104 independently of each other. The photographic pixel group 102 corresponds to the photographic pixel group 16 in FIG. 1, and the phase-difference detection pixel group 104 corresponds to the phase-difference detection pixel group 18 in FIG. 1.

An image acquired by the photographic pixel group 102 is also used as a monitor image to be displayed on the LCD monitor 20. For an actually photographed image, photographic gain and a photographic shutter speed are set automatically or in accordance with user settings. For the monitor image, first control values, such as first gain and a first shutter speed, are set so that a sharp and smooth image can be displayed on the LCD monitor 20. On the other hand, for the phase-difference detection pixel group 104, first control values, such as second gain and a second shutter speed, are set independently of the photographic pixel group 102 so as to enhance AF performance.

As shown in FIG. 4, the control device 100-1 includes a first-detection-value acquiring unit 106, a second-detection-value acquiring unit 108, a first-gain control unit 110, a second-gain control unit 112, a first-timing control unit 114, a second-timing control unit 116, a setting unit 118, and a memory 124.

The first-detection-value acquiring unit 106 detects an imaging signal from the photographic pixel group 102 and outputs a first detection value. The first detection value is output from the first-detection-value acquiring unit 106 to the first-gain control unit 110.

The second-detection-value acquiring unit 108 detects an imaging signal from the phase-difference detection pixel group 104 and outputs a second detection value. The second detection value is output from the second-detection-value acquiring unit 108 to the second-gain control unit 112. The phase-difference detection pixel group 104 and the first-detection-value acquiring unit 106 simultaneously read the respective imaging signals.

The first-gain control unit 110 performs gain adjustment on the first detection value based on the first gain. After amplifying the first detection value by applying the first gain thereto, the first-gain control unit 110 outputs the first detection value to a first-control-value arithmetic unit 120 in the setting unit 118.

The second-gain control unit 112 performs gain adjustment on the second detection value based on the second gain. The second-gain control unit 112 according to this embodiment functions independently of the first-gain control unit 110. After amplifying the second detection value by applying the second gain thereto, the second-gain control unit 112 outputs the second detection value to a second-control-value arithmetic unit 122 in the setting unit 118.

The first-timing control unit 114 performs exposure control of the photographic pixel group 102 based on the first shutter speed (i.e., a first exposure time). The first-timing control unit 114 controls the exposure of the photographic pixel group 102 based on the first shutter speed calculated by the first-control-value arithmetic unit 120 in the setting unit 118, which will be described later.

The second-timing control unit 116 performs exposure control of the phase-difference detection pixel group 104 based on a second exposure time (i.e., the second shutter speed). The second-timing control unit 116 functions independently of the first-timing control unit 114 and controls the exposure of the phase-difference detection pixel group 104 based on the second exposure time calculated by the second-control-value arithmetic unit 122 in the setting unit 118, which will be described later. The first-timing control unit 114 and the second-timing control unit 116 simultaneously expose the respective pixel groups to light.

The setting unit 118 is a functional unit that calculates control values used for performing exposure control of the pixel groups 102 and 104 and includes the first-control-value arithmetic unit 120 and the second-control-value arithmetic unit 122.

The first-control-value arithmetic unit 120 calculates the first shutter speed, the first gain for adjusting the first detection value, and a set value (referred to as "aperture value" hereinafter) of the diaphragm 14 based on the first detection value gain-adjusted at the first-gain control unit 110 and information from the lens unit. The information from the lens unit includes, for example, AF information and aperture information. Then, the first-control-value arithmetic unit 120 outputs the first shutter speed to the first-timing control unit 114, the first gain to the first-gain control unit 110, and the aperture value to the second-control-value arithmetic unit 122.

Based on the second detection value gain-adjusted at the second-gain control unit 112 and the aperture value calculated by the first-control-value arithmetic unit 120, the second-control-value arithmetic unit 122 calculates the second shutter speed and the second gain for adjusting the second detection value. Then, the second-control-value arithmetic unit 122 outputs the second shutter speed to the second-timing control unit 116 and the second gain to the second-gain control unit 112.

The memory 124 is a storage unit that stores therein, for example, various kinds of setting information and captured images of the digital camera 1. The memory 124 is constituted of a storage medium, such as a read-only memory (ROM) or a random access memory (RAM). For example, the various kinds of setting information stored in the memory 124 are read by the first-control-value arithmetic unit 120 and the second-control-value arithmetic unit 122 in the setting unit 118 so as to be used for arithmetic processes.

3. Exposure Control Process by Control Device

Figure 5:
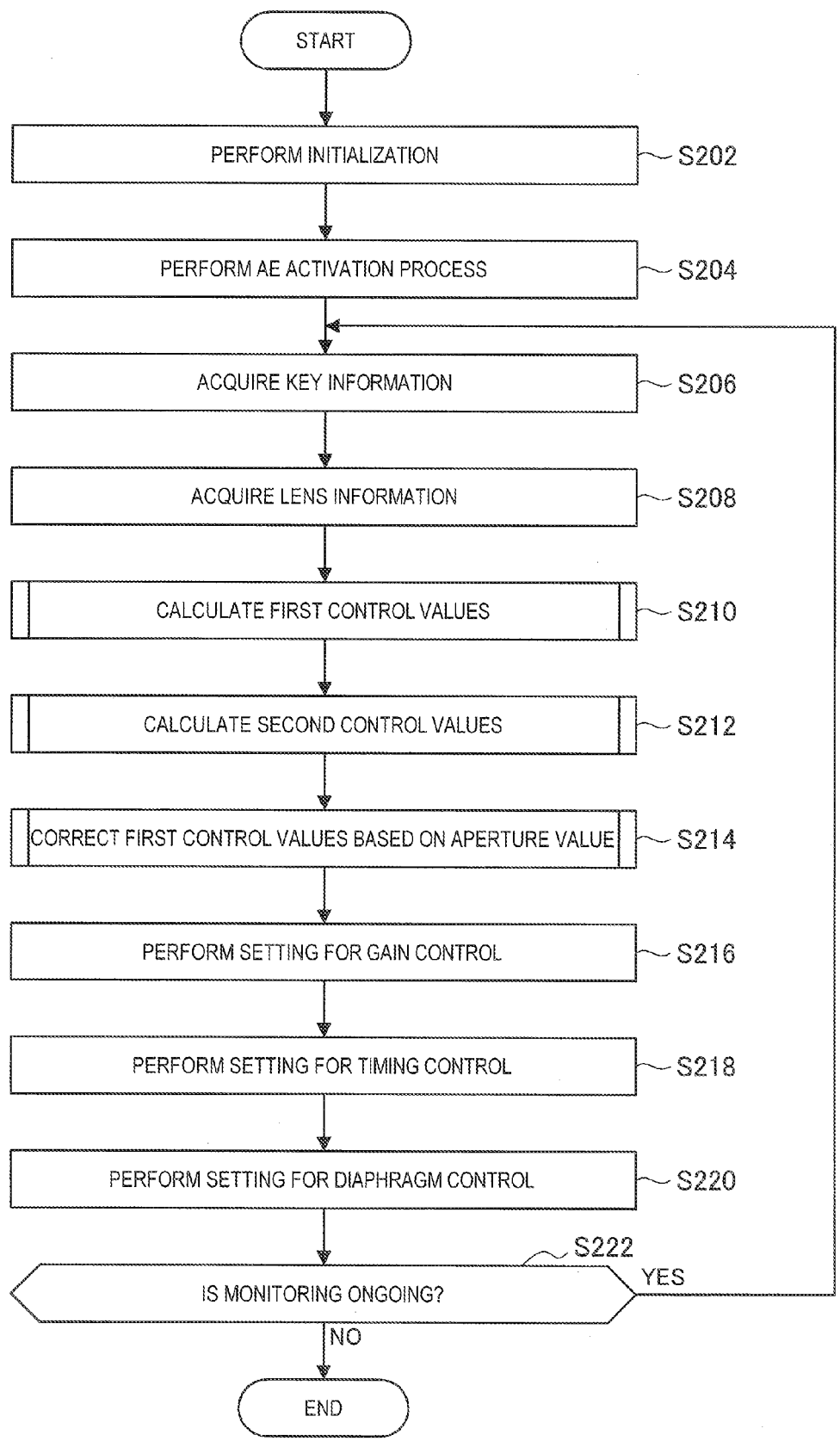
FIG. 5 is a flowchart schematically illustrating an exposure control process performed by the control device according to the embodiment.

Next, a general outline of an exposure control process performed by the control device 100-1 according to this embodiment will be described with reference to FIG. 5. FIG. 5 is a flowchart schematically illustrating the exposure control process performed by the control device 100-1 according to this embodiment.

S202: Initialization

First, as shown in FIG. 5, the control device 100-1 performs initialization when a photographing process is to be performed (step S202). The initialization involves setting an initial aperture value, an initial value of first gain for adjusting a first detection value of the photographic pixel group 102, an initial value of a first shutter speed, an initial value of second gain for adjusting a detection value of the phase-difference detection pixel group 104, and an initial value of a second shutter speed. In this case, the second gain is set in correspondence with an exposure value that is lower than the first gain, and the second shutter speed is set in correspondence with an exposure value that is higher than the first shutter speed.

Furthermore, the control device 100-1 sets an initial value of first target luminance for the photographic pixel group 102 and an initial value of second target luminance for the phase-difference detection pixel group 104. Target luminance is a target value of each control value, and a subsequent control value is set so as to follow the target value. Target luminance is to be used in a smoothing process for averaging out unevenness of brightness within an image. The initial value of the first target luminance is set to, for example, a value obtained by subtracting the first gain from a sum of the aperture value and a first exposure time, and the initial value of the second target luminance is set to, for example, a value obtained by subtracting the second gain from a sum of the aperture value and a second exposure time. Accordingly, the initial values of the first target luminance and the second target luminance are set to be different from each other.

S204: AE Activation Process

Subsequently, the control device 100-1 performs an AE activation process (step S204). In step S204, the first detection value of the photographic pixel group 102 and the second detection value of the phase-difference detection pixel group 104 are acquired and gain-adjusted. Then, based on these values, the first target luminance and the second target luminance are calculated. Each target luminance is set in accordance with a magnitude relationship obtained by comparing the corresponding gain-adjusted detection value with a preset threshold value.

S206: Acquisition of Key Information

When the AE activation process is completed, the control device 100-1 acquires key information (step S206). As the key information, operation information of, for example, an exposure mode, an exposure correction value, a preview mode, and an AF/MF switch state is acquired. The exposure mode can be acquired from the setting of the photographic mode dial 32, and the exposure correction value can be acquired from the setting of the exposure correcting dial 30. The preview mode can be acquired from the setting of the preview button 36, and the AF/MF switch state can be acquired from the setting of the AF/MF switch button 38.

S208: Acquisition of Lens Information

The control device 100-1 acquires lens information (step S208). As the lens information, for example, AF information and aperture information are acquired. The AF information is acquired from the focusing-lens driving mechanism that drives the focusing lens 12 or from a controller that controls the focusing-lens driving mechanism. The aperture information is acquired from the diaphragm mechanism that opens and closes the diaphragm blades of the diaphragm 14 or from a controller that controls the diaphragm mechanism.

S210: Calculation of First Control Values

Then, the control device 100-1 calculates first control values (step S210). In step S210, the first-control-value arithmetic unit 120 calculates the first control values, which include a first shutter speed at which the photographic pixel group 102 is exposed to light for a first exposure time, first gain for adjusting the first detection value, and an aperture value.

Figure 6:
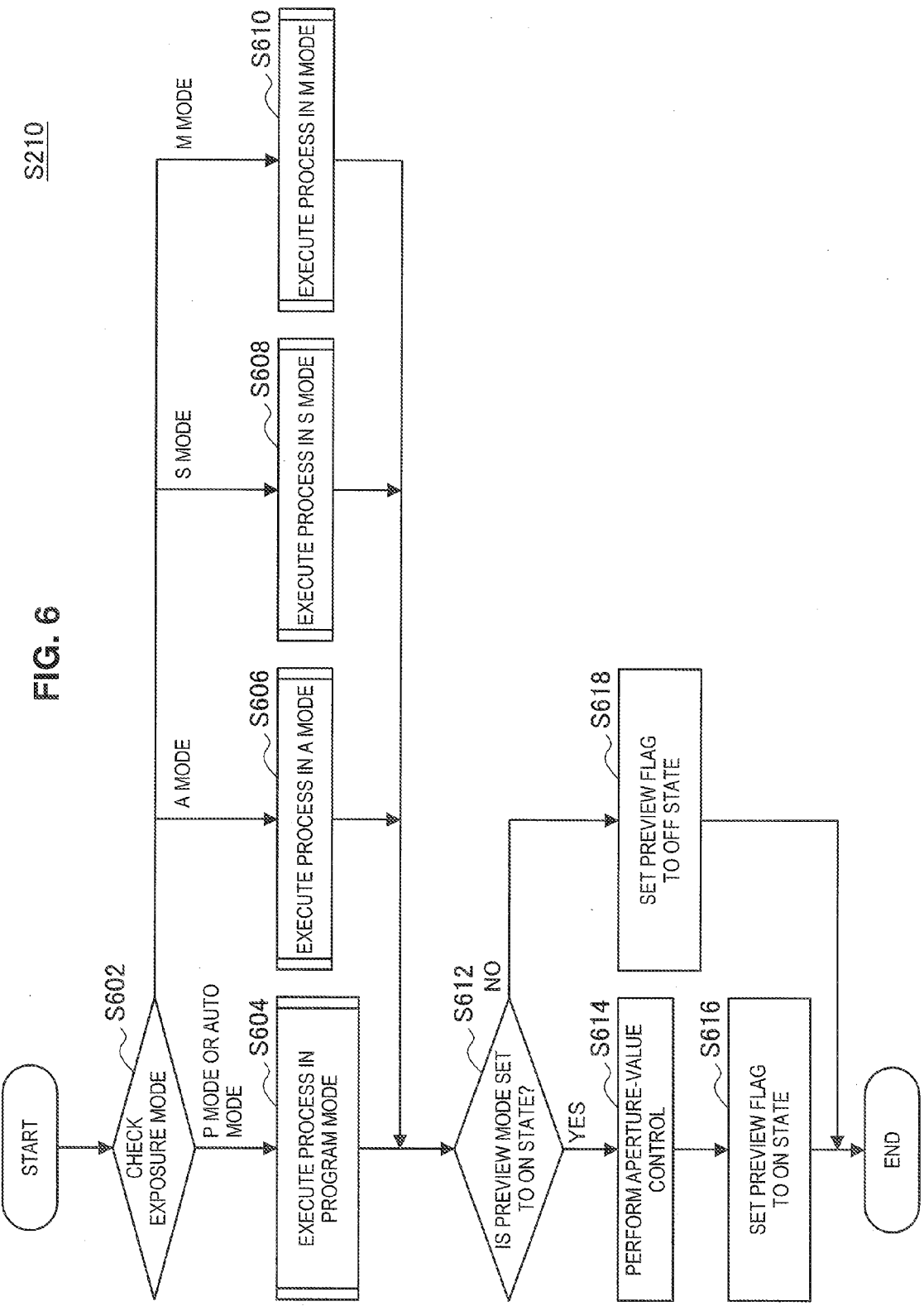
FIG. 6 is a flowchart illustrating a first-control-value calculation process according to the embodiment.
Figure 7:
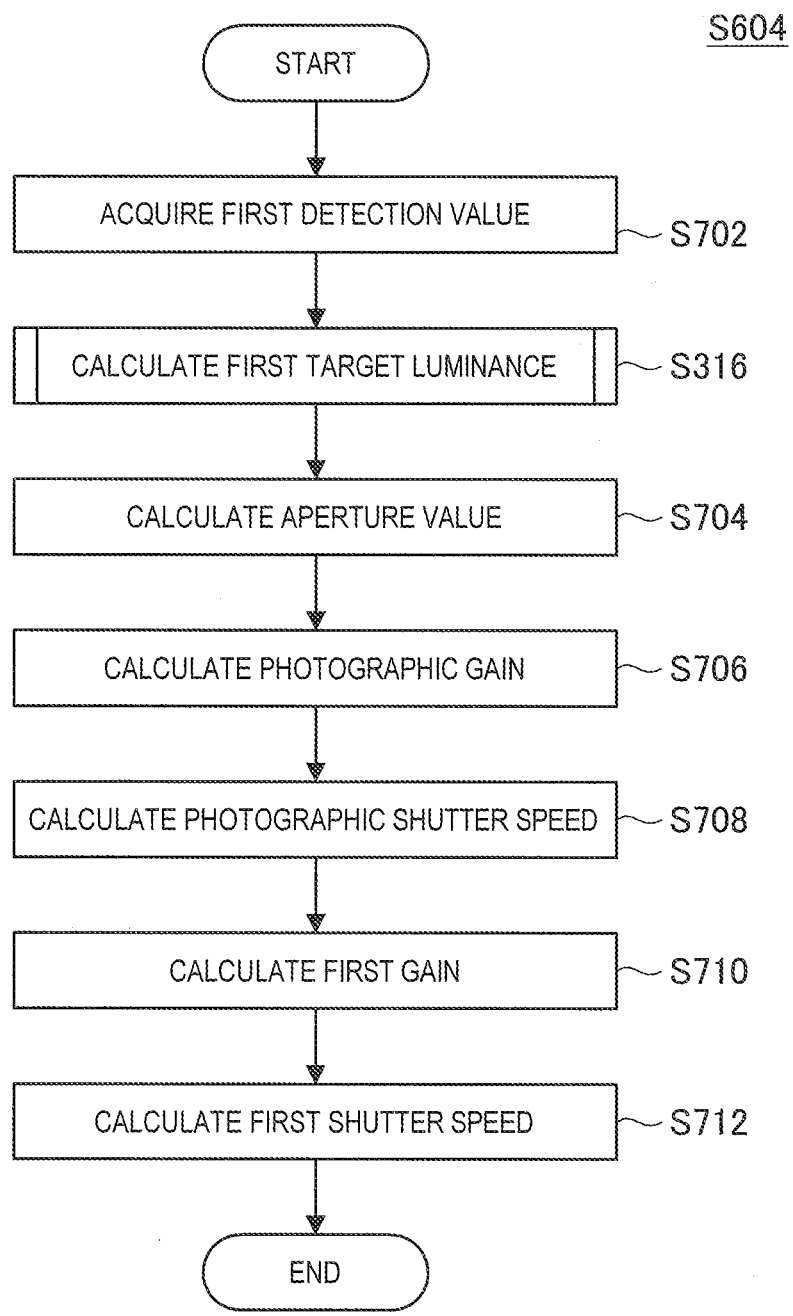
FIG. 7 is a flowchart illustrating a process in an auto mode or a program mode.
Figure 8:
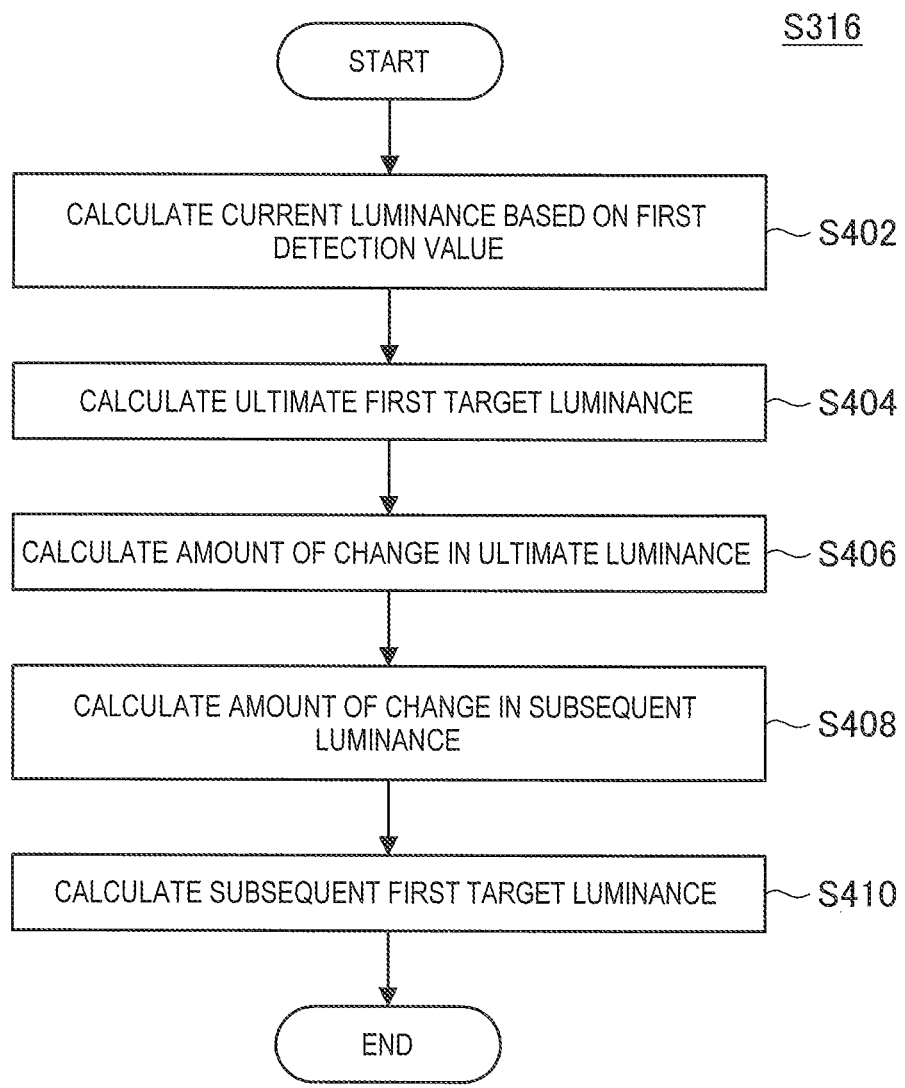
FIG. 8 is a flowchart illustrating a first-target-luminance calculation process.
Figure 9:
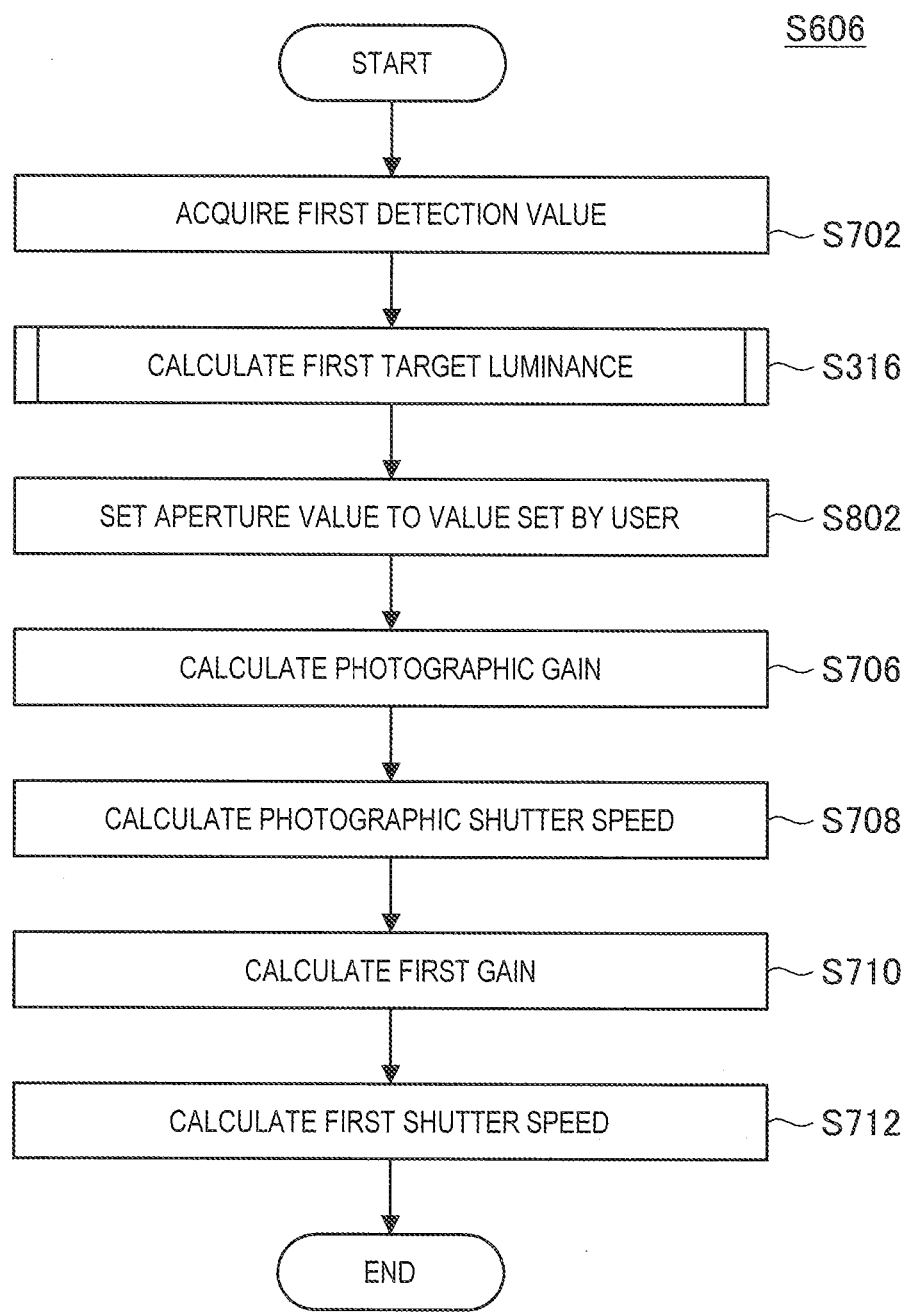
FIG. 9 is a flowchart illustrating a process in an aperture priority mode.
Figure 10:
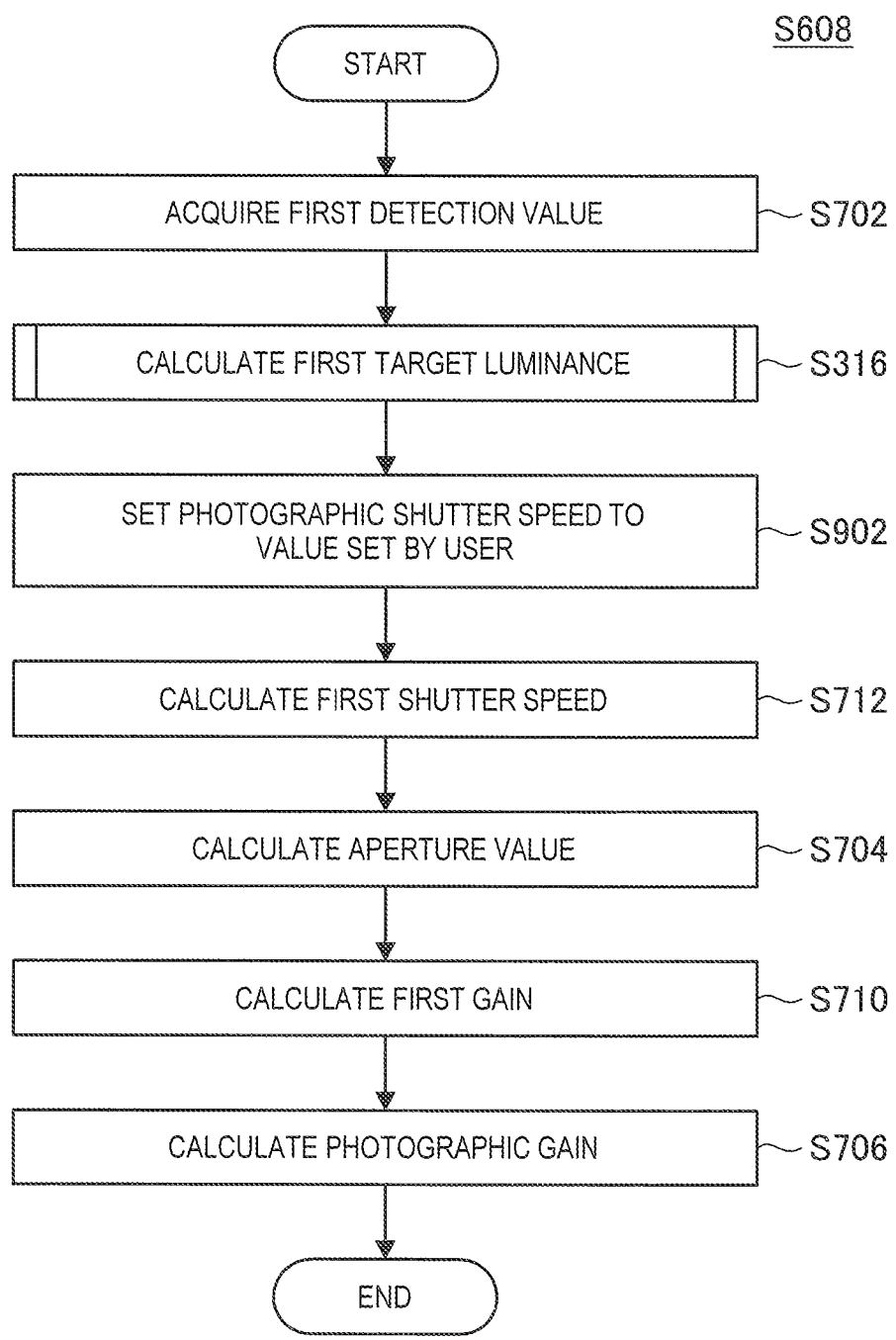
FIG. 10 is a flowchart illustrating a process in a shutter-speed priority mode.
Figure 11:
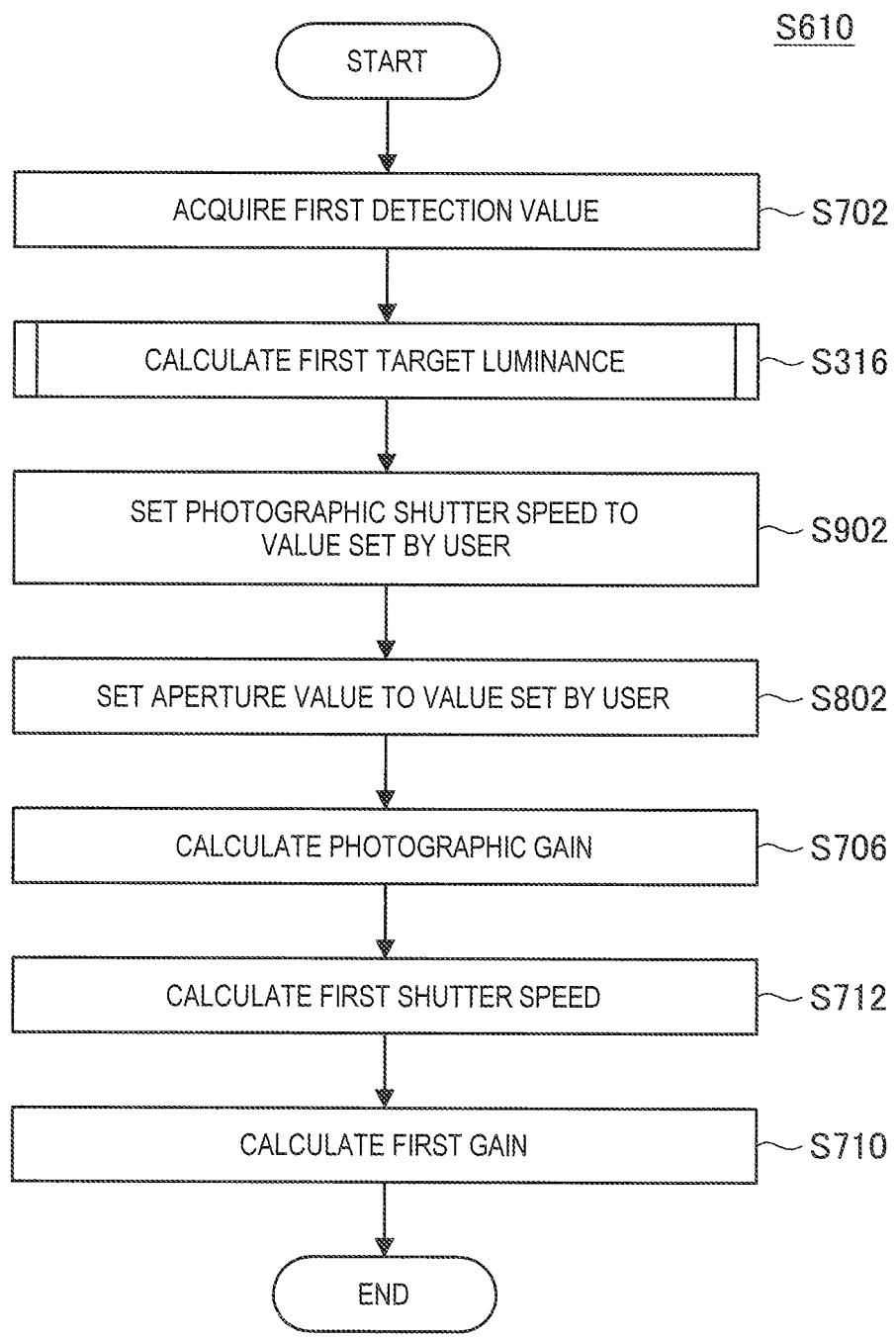
FIG. 11 is a flowchart illustrating a process in a manual exposure mode.
Figure 12:
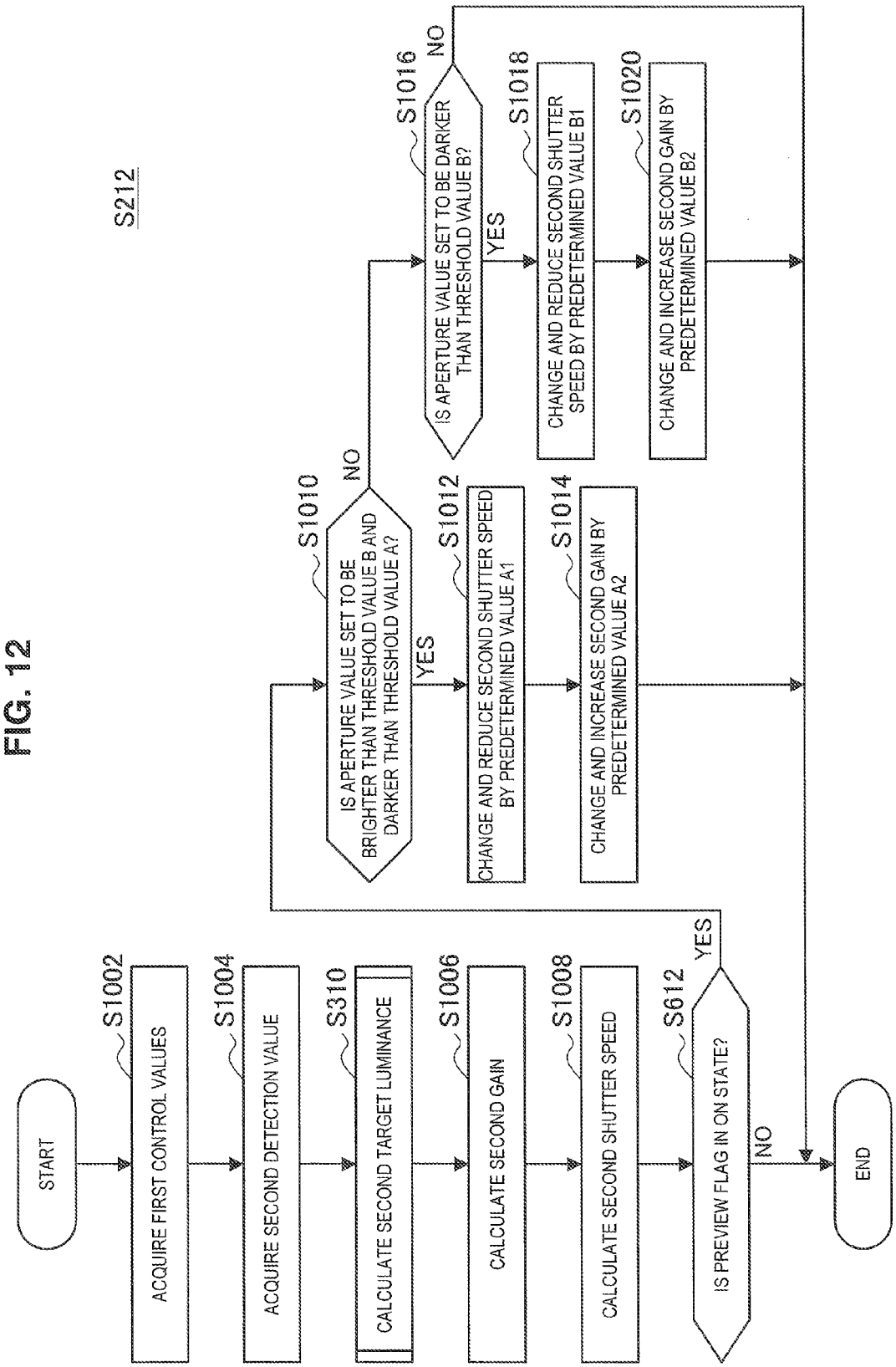
FIG. 12 is a flowchart illustrating a second-control-value calculation process according to the embodiment.

The process in step S210 will be described in detail with reference to FIGS. 6 to 12. FIG. 6 is a flowchart illustrating a first-control-value calculation process according to this embodiment. FIG. 7 is a flowchart illustrating a process in the auto mode or the program mode. FIG. 8 is a flowchart illustrating a first-target-luminance calculation process. FIG. 9 is a flowchart illustrating a process in the A mode. FIG. 10 is a flowchart illustrating a process in the S mode. FIG. 11 is a flowchart illustrating a process in the M mode. FIG. 12 is a flowchart illustrating a second-control-value calculation process according to this embodiment.

As shown in FIG. 6, in the process in step S210, the exposure mode is first checked (step S602). The exposure mode is acquired in step S206 in FIG. 5 based on the setting of the photographic mode dial 32. The control device 100-1 calculates and sets the first target luminance, the aperture value, the first gain, and the first shutter speed in accordance with the exposure mode.

If it is determined in step S602 that the exposure mode is the auto mode (Auto) or the program mode (P), the control device 100-1 calculates the first control values based on the flowchart shown in FIG. 7 (step S604). In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side, by using the first detection value gain-adjusted by the first-gain control unit 110 (step S316).

FIG. 8 illustrates the process in step S316 in detail. As shown in FIG. 8, the first-control-value arithmetic unit 120 first calculates current luminance based on the first detection value and second control values (step S402). This luminance indicates the current brightness of a subject.

Then, the first-control-value arithmetic unit 120 calculates ultimate first target luminance (step S404). The ultimate first target luminance indicates ultimately aimed brightness and is calculated based on the first detection value, a monitor reference level, and the exposure correction value. The monitor reference level is a fixed value and is a preset reference value. The ultimate first target luminance may be calculated based on, for example, expression (1) shown below.

$$\text{Ultimate Target Luminance} = \text{Current Luminance} + (\log_2(\text{First Detection Value}) - \log_2(\text{Monitor Reference Level})) - \text{Exposure Correction Value} \quad (1)$$

The first-control-value arithmetic unit 120 subtracts the current luminance calculated in step S402 from the ultimate first target luminance calculated in step S404 so as to obtain an amount of change in ultimate luminance (step S406). This amount of change in ultimate luminance is an amount of change when the first control values are made to follow target values.

Subsequently, the first-control-value arithmetic unit 120 calculates an amount of change in subsequent luminance to be set in a subsequent process based on the amount of change in ultimate luminance calculated in step S406 (step S408). For example, an amount of change in subsequent luminance $\Delta EV_1$ may be calculated based on expression (2) shown below.

$$\Delta EV_1 = \begin{cases} \min\left(\text{amount of change in ultimate luminance}, \Delta EV_{1\_p}\right) & \text{(positive value)} \\ \max\left(\text{amount of change in ultimate luminance}, \Delta EV_{1\_m}\right) & \text{(negative value)} \end{cases} \quad (2)$$

Then, the first-control-value arithmetic unit 120 adds the current luminance calculated in step S402 and the amount of change in subsequent luminance $\Delta EV_1$ calculated in step S408 together so as to obtain subsequent first target luminance (step S410). Specifically, the subsequent first target luminance is expressed by expression (3) shown below.

Subsequent First Target Luminance=Current Luminance+Amount of Change in Subsequent Luminance $\Delta EV_1$    (3)

Referring back to FIG. 7, when the subsequent first target luminance is calculated in step S316, the first-control-value arithmetic unit 120 calculates the aperture value (step S704). Based on the aperture value, the first-control-value arithmetic unit 120 calculates photographic gain (step S706) and then calculates a photographic shutter speed (step S708). The auto mode and the program mode are modes in which the digital camera 1 automatically performs exposure control. The photographic gain and the photographic shutter speed are automatically set based on the aperture value set in accordance with the subsequent first target luminance.

Subsequently, the first-control-value arithmetic unit 120 calculates the first gain (step S710) and then calculates the first shutter speed (step S712), which are for monitoring. In order to present to a user an image that is as identical to an actually photographed image as possible, it is desirable that the first gain and the first shutter speed be the same as the photographic gain and the photographic shutter speed, respectively. However, the first gain and the first shutter speed do not have to match the photographic gain and the photographic shutter speed, respectively.

The first control values in the auto mode or the program mode are calculated in this manner.

If it is determined in step S602 that the exposure mode is the aperture priority mode (A), the control device 100-1 calculates the first control values based on the flowchart shown in FIG. 9 (step S606). In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side (step S316). Since the processes in step S702 and step S316 are the same as those in the auto mode (Auto) or the program mode (P) described above, descriptions thereof will be omitted here.

When the first target luminance is calculated in step S316, the first-control-value arithmetic unit 120 sets the aperture value to a value set by the user (step S802). The aperture priority mode (A) is a mode in which the diaphragm 14 is set by the user and the aperture value is automatically controlled. As a result of step S802, the setting of the diaphragm 14 by the user is reflected on the settings of the digital camera 1.

Subsequently, the first-control-value arithmetic unit 120 calculates the photographic gain (step S706) and then calculates the photographic shutter speed (step S708). The photographic gain and the photographic shutter speed are automatically set based on the aperture value set by the user.

Subsequently, the first-control-value arithmetic unit 120 calculates the first gain (step S710) and then calculates the first shutter speed as a first exposure time (step S712), which are for monitoring. Since the processes in step S710 and step S712 are the same as those in the auto mode (Auto) or the program mode (P) described above, descriptions thereof will be omitted here. The first control values in the aperture priority mode (A) are calculated in this manner.

If it is determined in step S602 that the exposure mode is the shutter-speed priority mode (S), the control device 100-1 calculates the first control values based on the flowchart shown in FIG. 10 (step S608). In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side (step S316). Since the processes in step S702 and step S316 are the same as those in the auto mode (Auto) or the program mode (P) described above, descriptions thereof will be omitted here.

When the first target luminance is calculated in step S316, the first-control-value arithmetic unit 120 sets the photographic shutter speed to a value set by the user (step S902). The shutter-speed priority mode is a mode in which the exposure time is set by the user and the aperture value is automatically controlled. As a result of step S902, the photographic shutter speed set by the user is reflected on the settings of the digital camera 1. In step S704 to be described later, the aperture value is automatically controlled such that appropriate exposure is obtained in accordance with the photographic shutter speed.

Subsequently, the first-control-value arithmetic unit 120 calculates the first shutter speed (step S712) and then calculates the aperture value (step S704), which are for monitoring. The aperture value is set in accordance with the photographic shutter speed. Then, the first-control-value arithmetic unit 120 calculates the first gain (step S710) and then calculates the photographic gain (step S706). Since the processes in step S706, step S710, and step S712 are the same as those in the auto mode (Auto) or the program mode (P) described above, descriptions thereof will be omitted here. The first control values in the shutter-speed priority mode (S) are calculated in this manner.

If it is determined in step S602 that the exposure mode is the manual exposure mode (M), the control device 100-1 calculates the first control values based on the flowchart shown in FIG. 11 (step S610). The manual exposure mode is a mode in which the aperture value and the exposure time are set by the user. Therefore, the photographic shutter speed and the aperture value are set to values set by the user.

In this case, an imaging signal of the photographic pixel group 102 is first acquired as the first detection value by the first-detection-value acquiring unit 106 and is gain-adjusted by the first-gain control unit 110 (step S702). Then, the first-control-value arithmetic unit 120 calculates the first target luminance, which is for a smoothing process at the photographic-pixel-group side (step S316). Since the processes in step S702 and step S316 are the same as those in the auto mode (Auto) or the program mode (P) described above, descriptions thereof will be omitted here.

When the first target luminance is calculated in step S316, the first-control-value arithmetic unit 120 sets the photographic shutter speed to a value set by the user (step S902) and then sets the aperture value to a value set by the user (step S802). The process in step S902 is the same as that in the shutter-speed priority mode (S) described above, and the process in step S802 is the same as that in the aperture priority mode (A) described above.

Subsequently, the first-control-value arithmetic unit 120 calculates the photographic gain based on the photographic shutter speed and the aperture value (step S706). Moreover, the first-control-value arithmetic unit 120 calculates the first shutter speed (step S712) and then calculates the first gain (step S710), which are for monitoring. Since the processes in step S710 and step S712 are the same as those in the auto mode (Auto) or the program mode (P) described above, descriptions thereof will be omitted here. The first control values in the manual exposure mode (M) are calculated in this manner.

When the first control values are calculated in accordance with each exposure mode in the above-described manner, the first-control-value arithmetic unit 120 determines whether or not the preview mode is set to an on state (step S612). In the preview mode, a predetermined aperture value is temporarily set by user operation. The user can check an image acquired when the aperture value is set to that value by looking into, for example, the LCD monitor 20.

The setting of the preview mode is determined based on an on/off state of the preview button 36. When the preview button 36 is in an on state, the first-control-value arithmetic unit 120 performs open-close control of the diaphragm 14 to set it to the predetermined aperture value so that a preview is performed (step S614). When the control of the diaphragm 14 is completed, the control device 100-1 sets a preview flag, which indicates that the preview mode is in progress, to an on state (step S616) and ends the process shown in FIG. 6. On the other hand, when the preview button 36 is in an off state in step S612, the first-control-value arithmetic unit 120 sets the preview flag to an off state (step S618) and ends the process shown in FIG. 6.

S212: Calculation of Second Control Values

Referring back to FIG. 5, when the first control values are calculated in step S210 in accordance with the flowchart in FIG. 6, the control device 100-1 subsequently calculates second control values (step S212). In step S212, the second-control-value arithmetic unit 122 calculates a second shutter speed and second gain as the second control values.

Figure 13:
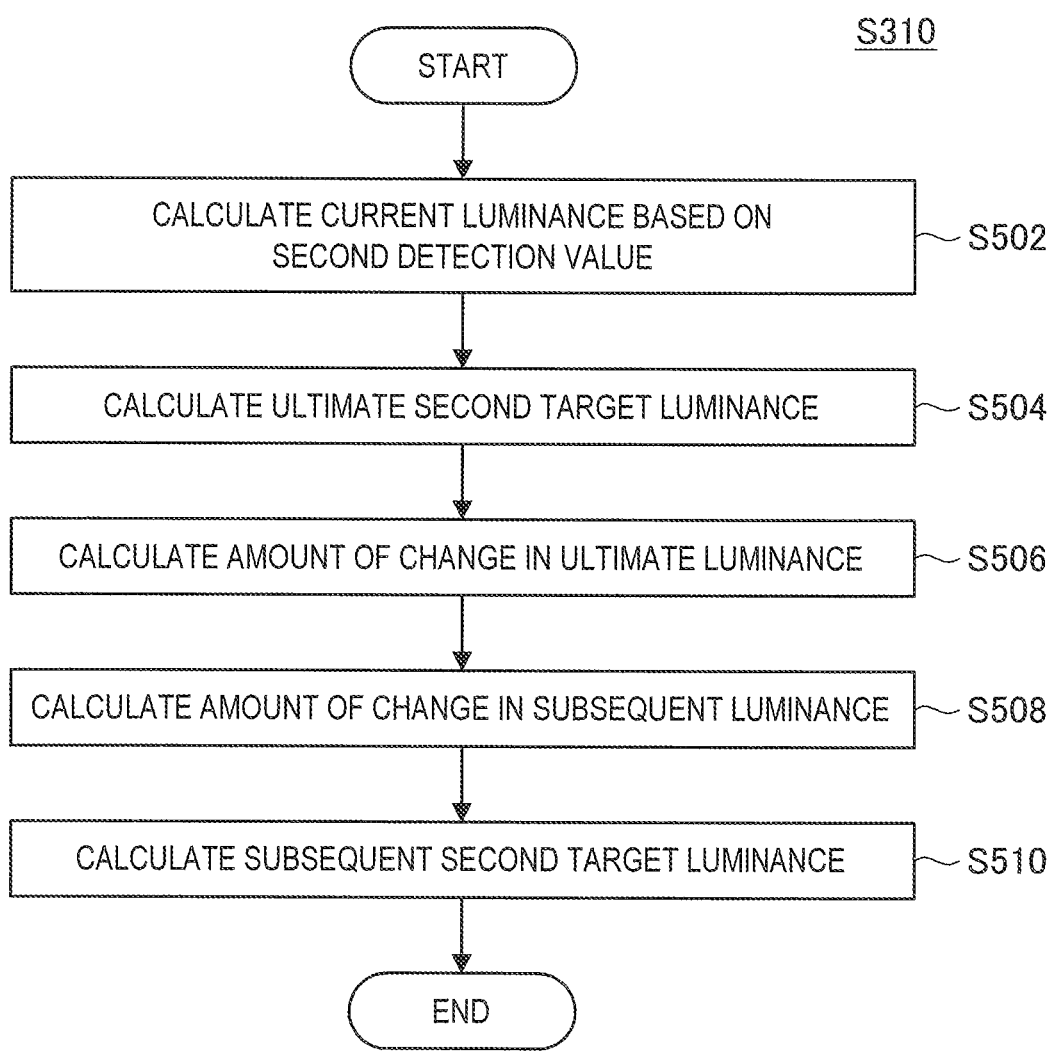
FIG. 13 is a flowchart illustrating a second-target-luminance calculation process.

The process in step S212 will be described in detail with reference to FIGS. 12 and 13. FIG. 12 is a flowchart illustrating a second-control-value calculation process according to this embodiment. FIG. 13 is a flowchart illustrating a second-target-luminance calculation process.

As shown in FIG. 12, in order to calculate the second control values, the control device 100-1 first causes the second-control-value arithmetic unit 122 to acquire the first control values (step S1002). With regard to the first control values, the values calculated in step S210 are used.

Subsequently, the control device 100-1 causes the second-detection-value acquiring unit 108 to acquire the second detection value (step S1004). The second detection value acquired by the second-detection-value acquiring unit 108 is adjusted based on the second gain at the second-gain control unit 112, and is subsequently output to the second-control-value arithmetic unit 122. Then, the second-control-value arithmetic unit 122 calculates the second target luminance by using the gain-adjusted second detection value (step S310).

FIG. 13 illustrates the process in step S310 in detail. As shown in FIG. 13, the second-control-value arithmetic unit 122 first calculates current luminance based on the second detection value and previous second control values (step S502). Then, the second-control-value arithmetic unit 122 calculates ultimate second target luminance (step S504). The ultimate second target luminance indicates ultimately aimed brightness and is calculated based on the second detection value and a phase-difference reference level. The phase-difference reference level is a fixed value and is a preset reference value.

The ultimate second target luminance may be calculated based on, for example, expression (4) shown below. In this case, ΔMF_Offset indicates a photometric-range offset value when performing manual focusing and is set to, for example, an exposure value (EV) of 2. When performing autofocusing, ΔMF_Offset is equal to zero.

Ultimate Second Target Luminance=Current Luminance+($\log_2$(Second Detection Value)−$\log_2$ (Phase-Difference Reference Level))−ΔMF_Offset  (4)

Alternatively, the ultimate second target luminance may be calculated based on expression (5) shown below in view of a second-luminance correction amount. In this case, the second-luminance correction amount is set to a value in which the upper and lower limits for the luminance correction amount are limited to ±1 EV.

Ultimate Second Target Luminance=Current Luminance+($\log_2$(Second Detection Value)−$\log_2$ (Phase-Difference Reference Level))−Second-Luminance Correction Amount+ΔMF_Offset  (5)

Then, the second-control-value arithmetic unit 122 subtracts the current luminance calculated in step S502 from the ultimate second target luminance calculated in step S504 so as to obtain an amount of change in ultimate luminance (step S506). This amount of change in ultimate luminance is an amount of change when the second control values are made to follow target values.

Subsequently, the second-control-value arithmetic unit 122 calculates an amount of change in subsequent luminance to be set in a subsequent process based on the amount of change in ultimate luminance calculated in step S506 (step S508). For example, an amount of change in subsequent luminance $\Delta EV_2$ may be calculated based on expression (6) shown below.

$$\Delta EV_2 = \begin{cases} \min\left(\begin{array}{c}\text{amount of change in ultimate}\\ \text{second luminance, } \Delta EV_{2\_p}\end{array}\right) & \text{(positive value)} \\ \max\left(\begin{array}{c}\text{amount of change in ultimate}\\ \text{second luminance, } \Delta EV_{2\_m}\end{array}\right) & \text{(negative value)} \end{cases} \quad (6)$$

In this case, $\Delta EV_{2\_p}$ for the phase-difference detection pixel group 104 is set to be larger than or equal to $\Delta EV_{1\_p}$ for the photographic pixel group 102. Alternatively, $\Delta EV_{2\_p}$ may be an infinite value that is set such that the target luminance can be reached as quickly as possible. Likewise, $\Delta EV_{2\_m}$ for the phase-difference detection pixel group 104 is set to be smaller than or equal to $\Delta EV_{1\_m}$ for the photographic pixel group 102. Alternatively, $\Delta EV_{2\_m}$ may be a negative infinite value that is set such that the target luminance can be reached as quickly as possible. Accordingly, high-speed smoothing of the phase-difference detection pixel group 104 can be achieved, whereby the time it takes to reach appropriate exposure in phase-difference AF can be shortened. Thus, AF response can be enhanced.

Then, the second-control-value arithmetic unit 122 adds the current luminance calculated in step S502 and the amount of change in subsequent luminance calculated in step S508 together so as to obtain subsequent second target luminance (step S510). Specifically, the subsequent second target luminance is expressed by expression (7) shown below. The subsequent second target luminance is used as a phase-difference control value in a subsequent cycle.

Subsequent Second Target Luminance=Current Luminance+Amount of Change in Subsequent Luminance $\Delta EV_2$  (7)

Referring back to FIG. 12, when the subsequent second target luminance is calculated in step S310, the second-control-value arithmetic unit 122 calculates the second gain (step S1006). The second gain is set to an interlocking range that is wider than that of the first gain. Thus, the second gain can correspond to high sensitivity, whereby appropriate exposure can be obtained in phase-difference AF. Alternatively, the second gain may be a fixed value. By making the second gain a fixed value, stable AF performance can be realized during phase-difference AF.

Then, the second-control-value arithmetic unit 122 calculates the second shutter speed (step S1008). The second shutter speed is also set to an interlocking range that is wider than that of the first gain. Thus, the second shutter speed can be set to a low value, whereby appropriate exposure can be obtained in phase-difference AF. Alternatively, the second shutter speed may be a fixed value. By making the second shutter speed a fixed value, stable AF performance can be realized during phase-difference AF.

In this embodiment, the interlocking range of the second gain is set to be wider than the interlocking range of the first gain in step S1006, and the interlocking range of the second shutter speed is set to be wider than the interlocking range of the first shutter speed in step S1008. However, the present technology is not limited to this example. Appropriate exposure in phase-difference AF can be obtained by executing at least one of step S1006 and step S1008.

Subsequently, the second-control-value arithmetic unit 122 determines whether or not the preview flag is in an on state (step S612). The second-control-value arithmetic unit 122 performs this determination process based on the on/off state of the preview flag set in step S616 or S618 in FIG. 6. When the preview flag is in an off state, the second-control-value arithmetic unit 122 ends the process shown in FIG. 12. On the other hand, when the preview flag is in an on state, the second-control-value arithmetic unit 122 changes the settings of the second control values (step S1010 to step S1020).

Specifically, the second-control-value arithmetic unit 122 first determines whether or not the aperture value is set to be brighter than a threshold value B and darker than a threshold value A (step S1010). When the aperture value is set to be brighter than the threshold value B and darker than the threshold value A, the second-control-value arithmetic unit 122 changes the second shutter speed by reducing it by a predetermined value A1 (step S1012). Moreover, the second-control-value arithmetic unit 122 changes the second gain by increasing it by a predetermined value A2 (step S1014).

For example, it is assumed that the threshold value A is F8 and the threshold value B is F5.6. In this case, if the aperture value is set to be brighter than F5.6 and darker than F8, the second shutter speed is reduced by the predetermined value A1 (e.g., 0.5 EV). Moreover, the second gain is increased in sensitivity by the predetermined value A2 (e.g., 0.5 EV).

On the other hand, when it is determined that the aperture value is set to be darker than the threshold value B or is set to be brighter than the threshold value A in step S1010, the second-control-value arithmetic unit 122 determines whether the aperture value is set to be darker than the threshold value B (step S1016). When the aperture value is set to be darker than the threshold value B, the second-control-value arithmetic unit 122 changes the second shutter speed by reducing it by a predetermined value B1 (step S1018). Moreover, the second-control-value arithmetic unit 122 changes the second gain by increasing it by a predetermined value B2 (step S1020).

For example, when the threshold value A is F8 and the threshold value B is F5.6, if the aperture value is set to be darker than F5.6, the second shutter speed is reduced by the predetermined value B1 (e.g., 1.0 EV). Moreover, the second gain is increased in sensitivity by the predetermined value B2 (e.g., 1.0 EV). In this case, the predetermined values B1 and B2 are set to be higher than the predetermined values A1 and A2, respectively.

After step S1010 to step S1020, the second-control-value arithmetic unit 122 ends the process shown in FIG. 12. If it is determined in step S1016 that the aperture value is set to be brighter than the threshold value A, the second-control-value arithmetic unit 122 ends the process shown in FIG. 12 without changing the second gain and the second shutter speed.

Accordingly, in the control device 100-1 according to this embodiment, exposure control of the photographic pixel group 102 and exposure control of the phase-difference detection pixel group 104 are performed independently of each other. The control device 100-1 controls the gain or the exposure time of the photographic pixel group 102 and the gain or the exposure time of the phase-difference detection pixel group 104 independently of each other. Thus, with regard to the photographic pixel group 102, an image desired by the user can be acquired, and the gain and the shutter speed are set such that a sharp and smooth monitor image can be presented to the user. With regard to the phase-difference detection pixel group 104, in order to achieve sufficient brightness for enhanced AF performance, the gain and the shutter speed are set such that the interlocking ranges thereof are wider than those for the photographic pixel group 102.

Furthermore, unlike the first control values, the second control values are set automatically regardless of the exposure mode. Thus, the second gain and the second shutter speed can be set such that appropriate exposure is constantly obtained for the phase-difference detection pixel group 104 regardless of the exposure mode, thereby allowing for enhanced AF performance. Alternatively, depending on conditions, the second control values may be set to fixed values regardless of the exposure mode. Thus, phase-difference AF can be performed stably, thereby allowing for enhanced AF performance.

For example, it is assumed that the interlocking range of the first gain set in step S210 is between ISO 100 and ISO 3200, and the interlocking range of the first shutter speed is between 1/15 and 1/8000. In this case, in step S212, for example, the interlocking range of the second gain is set to a range between ISO 50 and ISO 12800, and the interlocking range of the second shutter speed is set to a range between 1 and 1/16000. Alternatively, for example, the second gain may be fixed at ISO 400, and the second shutter speed may be fixed at 1/60.

S214: Correction of First Control Values Based on Aperture Value

Referring back to FIG. 5, when the second control values are calculated in step S212, the control device 100-1 subsequently performs a first-control-value correction process, where appropriate (step S214). In step S214, when the user reduces the aperture of the diaphragm 14 during controlling of a monitor image in the AF/MF mode or the preview mode, brightness with which sufficient AF performance can be achieved in exposure control of the phase-difference detection pixel group 104 is maintained.

Figure 14:
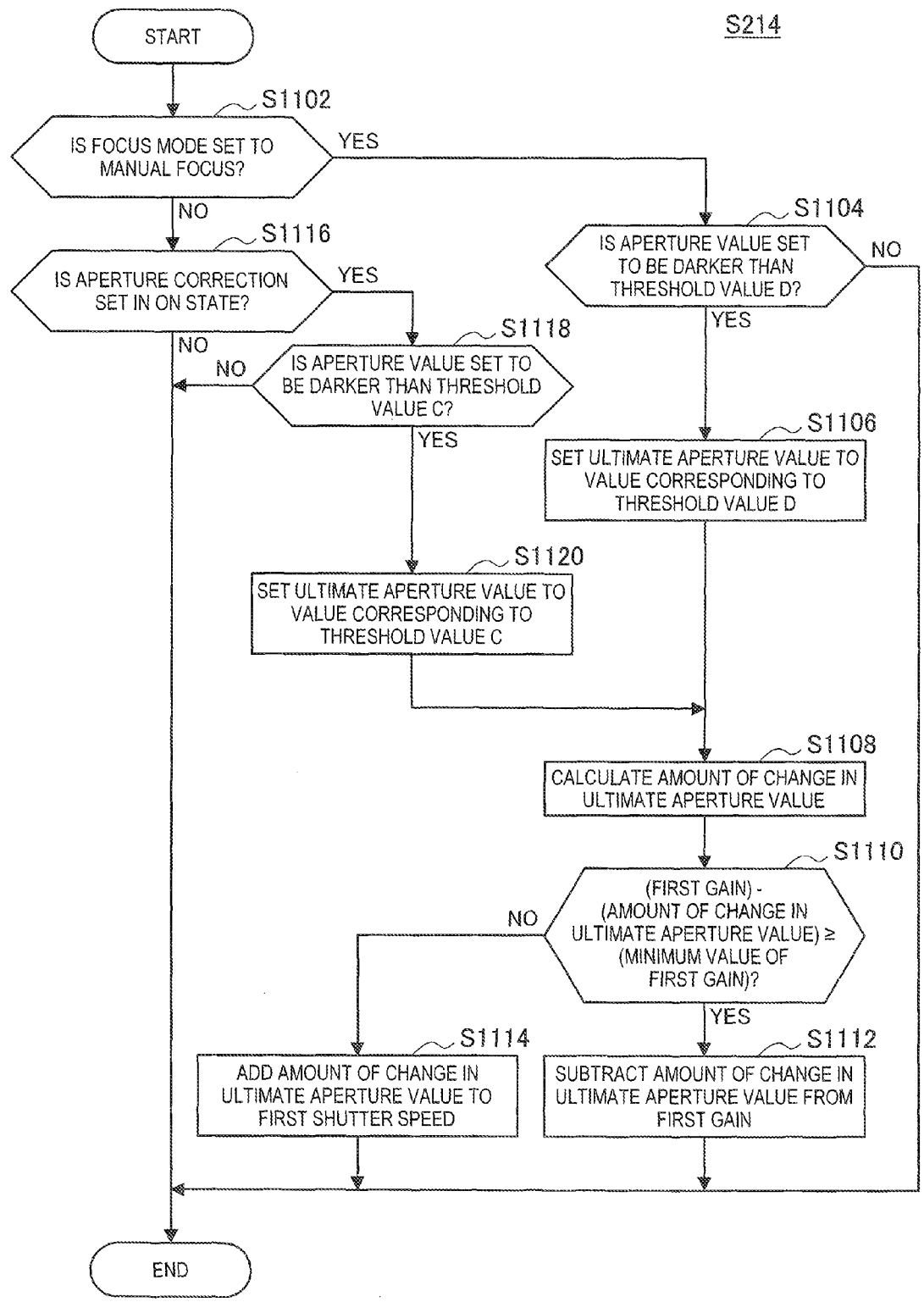
FIG. 14 is a flowchart illustrating a first-control-value correction process based on an aperture value, in accordance with the embodiment.

Specifically, in a state where the aperture of the diaphragm 14 is reduced, the first control values for the photographic pixel group 102 are corrected in accordance with the aperture value set by the user by performing a process in FIG. 14. On the other hand, with regard to the phase-difference detection pixel group 104, the second shutter speed is set to a low value and the second gain is set to high sensitivity even in the state where the aperture of the diaphragm 14 is reduced, so that brightness sufficient for AF performance is obtained.

The first-control-value correction process will be described with reference to FIG. 14. As shown in FIG. 14, the first-control-value arithmetic unit 120 first determines whether the focus mode is set to manual focus (step S1102). The determination of whether the focus mode is set to manual focus can be performed based on the setting of the AF/MF switch button 38. When the focus mode is set to manual focus, the first-control-value arithmetic unit 120 determines whether or not the aperture value is set to be darker than a threshold value D (step S1104). The threshold value D may be, for example, F11. When the aperture value is set to be brighter than or equal to the threshold value D in step S1104, the first-control-value arithmetic unit 120 ends the process in FIG. 14 without changing the first control values.

On the other hand, when it is determined in step S1104 that the aperture value is set to be darker than the threshold value D, the first-control-value arithmetic unit 120 sets an ultimate aperture value to a value corresponding to the threshold value D (step S1106). Then, the first-control-value arithmetic unit 120 calculates an amount of change in ultimate aperture value for achieving the ultimate aperture value set in step S1106 (step S1108). Specifically, an amount of change in ultimate aperture value $\Delta AV$ is a difference between the aperture value set in step S210 and the ultimate aperture value set in step S1106 and is expressed by expression (8) shown below.

Amount of Change in Ultimate Aperture Value
$$\Delta AV = (\text{Aperture Value}) - (\text{Ultimate Aperture Value}) \quad (8)$$

Subsequently, the first-control-value arithmetic unit 120 determines whether or not to correct the first gain or the first shutter speed (step S1110). This determination of whether or not to perform the correction is performed by determining whether or not a value obtained by subtracting the amount of change in ultimate aperture value $\Delta AV$ from the first gain is larger than or equal to a minimum value of the first gain. Specifically, in step S1110, it is determined whether or not the corrected first gain is larger than the minimum value of the first gain.

When the value obtained by subtracting the amount of change in ultimate aperture value $\Delta AV$ from the first gain is larger than or equal to the minimum value of the first gain, the first-control-value arithmetic unit 120 corrects the first gain to the value obtained by subtracting the amount of change in ultimate aperture value $\Delta AV$ from the first gain (step S1112). On the other hand, when the value obtained by subtracting the amount of change in ultimate aperture value $\Delta AV$ from the first gain is smaller than the minimum value of the first gain, the first-control-value arithmetic unit 120 corrects the first shutter speed to a value obtained by adding the amount of change in ultimate aperture value ΔAV to the first shutter speed (step S1114).

Referring back to step S1102, if the focus mode is not set to manual focus in step S1102, the first-control-value arithmetic unit 120 determines whether or not aperture correction is set in an on state (step S1116). The setting of the aperture correction can be confirmed from a backup value or menu settings. When it is determined in step S1116 that the aperture correction is set in an off state, the first-control-value arithmetic unit 120 ends the process in FIG. 14 without changing the first control values.

On the other hand, when it is determined in step S1116 that the aperture correction is set in an on state, the first-control-value arithmetic unit 120 determines whether or not the aperture value is set to be darker than a threshold value C (step S1118). The threshold value C is set to a value smaller than the threshold value D and may be, for example, F5.6. When the aperture value is set to be brighter than or equal to the threshold value C in step S1118, the first-control-value arithmetic unit 120 ends the process in FIG. 14 without changing the first control values.

On the other hand, when it is determined in step S1118 that the aperture value is set to be darker than the threshold value C, the first-control-value arithmetic unit 120 sets the ultimate aperture value to a value corresponding to the threshold value C (step S1120). Then, the first-control-value arithmetic unit 120 calculates an amount of change in ultimate aperture value for achieving the ultimate aperture value set in step S1120 (step S1108).

The amount of change in ultimate aperture value is calculated similarly to the above description based on expression (8) shown above. Similar to the above description, when the amount of change in ultimate aperture value is calculated, it is determined whether or not to correct the first gain or the first shutter speed (step S1110). When a value obtained by subtracting the amount of change in ultimate aperture value ΔAV from the first gain is larger than or equal to the minimum value of the first gain, the first-control-value arithmetic unit 120 corrects the first gain to the value obtained by subtracting the amount of change in ultimate aperture value ΔAV from the first gain (step S1112). On the other hand, when the value obtained by subtracting the amount of change in ultimate aperture value ΔAV from the first gain is smaller than the minimum value of the first gain, the first-control-value arithmetic unit 120 corrects the first shutter speed to a value obtained by adding the amount of change in ultimate aperture value ΔAV to the first shutter speed (step S1114).

Accordingly, the first control values are corrected in accordance with the aperture value based on the processing flow shown in FIG. 14.

S216: Gain Control

When the first control values and the second control values are calculated, the control device 100-1 performs setting for gain control (step S216). The first-control-value arithmetic unit 120 outputs the calculated first gain to the first-gain control unit 110 so as to update the first gain. The second-control-value arithmetic unit 122 outputs the calculated second gain to the second-gain control unit 112 so as to update the second gain.

S218: Timing Control

Subsequently, the control device 100-1 performs setting for timing control (step S218). The first-control-value arithmetic unit 120 outputs the calculated first shutter speed to the first-timing control unit 114 where exposure control is performed such that the photographic pixel group 102 is exposed to light for a first exposure time. The second-control-value arithmetic unit 122 outputs the calculated second shutter speed to the second-timing control unit 116 where exposure control is performed such that the phase-difference detection pixel group 104 is exposed to light for a second exposure time.

S220: Diaphragm Control

Then, the control device 100-1 performs setting for diaphragm control (step S220). The first-control-value arithmetic unit 120 outputs the set aperture value to a diaphragm drive controller (not shown) that drives the diaphragm mechanism. The diaphragm drive controller drives the diaphragm mechanism to open and close the diaphragm 14 so that the diaphragm 14 is set to the aperture value.

S222: Monitoring Ongoing-State Determination

Subsequently, the control device 100-1 determines whether monitoring is ongoing (step S222). If monitoring through the LCD monitor 20 is ongoing, the control device 100-1 returns to step S206 so as to repeat the process from step S206. If monitoring is finished, the process shown in FIG. 5 ends.

The control device 100-1 according to this embodiment and the exposure control method performed by this control device 100-1 have been described above. According to this embodiment, the first control values for controlling the exposure of the photographic pixel group 102 and the second control values for controlling the exposure of the phase-difference detection pixel group 104 are set independently of each other. Thus, with regard to the photographic pixel group 102, an image desired by the user can be acquired, and the gain and the shutter speed are set such that a sharp and smooth monitor image can be presented to the user. With regard to the phase-difference detection pixel group 104, in order to achieve sufficient brightness for enhanced AF performance, the gain and the shutter speed are set such that the interlocking ranges thereof are wider than those for the photographic pixel group 102.

4. Modifications 4.1. Exposure Correction by User

Although appropriate exposure is set in the digital camera 1 by automatically measuring the brightness of the overall picture, there may be a case where the image is not that desired by the user. In such a case, the user may perform exposure correction so that an image photographed to be brighter or darker than the appropriate exposure can be acquired.

In this case, if exposure correction is also performed on the phase-difference detection pixel group 104, the AF performance may possibly deteriorate. Furthermore, if the monitor image is not appropriately maintained when ultimate control values are set based on the monitor image, proper photometry may be not performed due to principle restrictions of imager photometry, possibly making it difficult to perform control according to an exposure correction value set based on the ultimate control values. If exposure correction is to be performed by the user in the above-described control process, the exposure correction set by the user may be not applied to the phase-difference detection pixel group 104.

Specifically, when the user performs exposure correction, a process is performed similarly to step S212 described above so as to acquire second control values for the phase-difference detection pixel group 104 without applying the exposure correction thereto. Then, the first-control-value arithmetic unit 120 applies the exposure correction set by the user to the calculated second control values so as to set photographic control values for the photographic pixel group 102. When the user performs the exposure correction in this manner, ultimate control values are set based on the control values for the phase-difference detection pixel group 104, so that deterioration of photometric performance occurring in the related art can be prevented. Thus, constantly stable AF performance and AE performance can be achieved, regardless of the exposure correction set by the user.

In the case where the user performs exposure correction, instead of not applying the exposure correction to the phase-difference detection pixel group 104, for example, the exposure correction may be applied to the phase-difference detection pixel group 104 in a range in which it is not affected by deterioration of photometric performance.

4.2. Calculation of Control Values Based on AF/MF Mode

In the exposure control method according to this embodiment, AF information is acquired as lens information in step S208 shown in FIG. 5. By using the AF information, the calculation process of the first control values for the photographic pixel group 102 and the calculation process of the second control values for the phase-difference detection pixel group 104 may be switched.

For example, when in the autofocus mode based on the AF information, the first-control-value arithmetic unit 120 may set the aperture value based on the second control values calculated by the second-control-value arithmetic unit 122.

Furthermore, when in the manual focus mode based on the AF information, the first-control-value arithmetic unit 120 may set the first gain, the first shutter speed, and the aperture value based on conditions different from those of the autofocus mode. Moreover, the second-control-value arithmetic unit 122 may set a target value for each of the values included in the second control values to a value deviated from the corresponding first control value by a predetermined amount.

Thus, control values suitable for the focus modes can be set.

5. Hardware Configuration

The process performed by the control device 100-1 according to the above-described embodiment is achieved in accordance with cooperation between software and hardware of the control device 100-1 to be described below.

Figure 15:
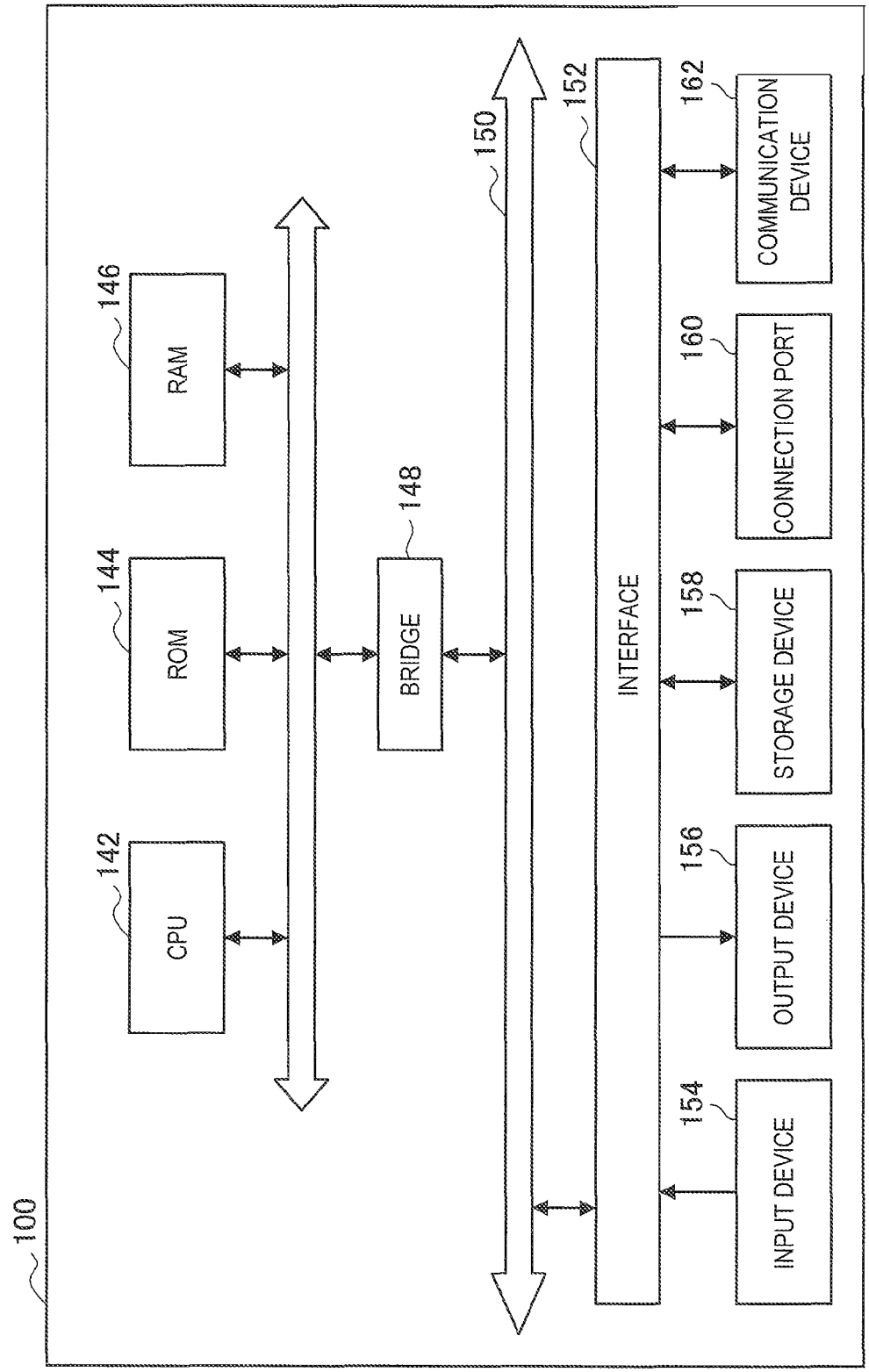
FIG. 15 illustrates a hardware configuration of the control device according to an embodiment of the present disclosure.

FIG. 15 illustrates a hardware configuration of the control device 100-1 according to the embodiment of the present disclosure. As shown in FIG. 15, the control device 100-1 includes a central processing unit (CPU) 142, a read-only memory (ROM) 144, a random access memory (RAM) 146, a bridge 148, a bus 150, an interface 152, an input device 154, an output device 156, a storage device 158, a connection port 160, and a communication device 162.

The CPU 142 functions as an arithmetic processor and a controller and realizes the operation of the setting unit 118, the first-control-value arithmetic unit 120, the second-control-value arithmetic unit 122, a light control unit 130, a selecting unit 132, a main-light-emission-quantity arithmetic unit 134, and a light-emission control unit 136 within the control device 100-1 by operating in cooperation with various kinds of programs. Alternatively, the CPU 142 may be a micro-processor. The ROM 144 stores therein, for example, a program or an arithmetic parameter to be used by the CPU 142. The RAM 146 temporarily stores therein, for example, a program to be used in execution of the CPU 142 or a parameter that appropriately changes in the execution. The ROM 144 and the RAM 146 realize a part of the memory 124 within the control device 100-1. The CPU 142, the ROM 144, and the RAM 146 are connected to one another by an internal bus constituted of, for example, a CPU bus.

The input device 154 includes, for example, an input section, such as a touch-screen, a button, a microphone, a switch, and a lever, configured to be used by a user for inputting information, and an input control circuit that generates an input signal based on input from the user and that outputs the signal to the CPU 142. The user of the control device 100-1 operates the input device 154 so as to input various kinds of data to the control device 100-1 or to command execution of processing.

The output device 156 performs, for example, output to a device, such as a liquid-crystal display (LCD) device, an organic light emitting diode (OLED) device, or a lamp. Furthermore, the output device 156 may perform audio output to, for example, a speaker and a headphone.

The storage device 158 is a device for storing data therein. The storage device 158 may include, for example, a storage medium, a storage unit that stores data into a storage medium, a reading unit that reads data from a storage medium, and a deleting unit that deletes data stored in a storage medium. The storage device 158 stores therein a program to be executed by the CPU 142 as well as various kinds of data.

The communication device 160 is, for example, a bus for connecting to an external device or a peripheral device of the control device 100-1. The communication device 160 may be a universal serial bus (USB).

The communication device 162 is, for example, a communication interface constituted of a communication unit for connecting to a network. The communication device 162 may be an infrared-communication-compliant device, a wireless local-area-network (LAN) compliant communication device, a long-term-evolution (LTE) compliant communication device, or a wired communication device that performs wired communication.

Although a preferred embodiment of the present disclosure has been described above in detail with reference to the appended drawings, the technical scope of the present disclosure is not limited to the above example. It should be understood by those with a general knowledge of the technical field of the present disclosure that various modifications or alterations may occur insofar as they are within the technical scope of the appended claims, and that these modifications or alterations are included in the technical scope of the present disclosure.

For example, although the control device 100-1 is included in the digital camera 1 in the above embodiment, the present technology is not limited to this example. For example, at least a part of the function included in the control device 100-1 may be provided in, for example, a server connected in a communicable manner to the imaging apparatus via a network. For example, in the control device 100-1 shown in FIG. 4, the functional units excluding the first-detection-value acquiring unit 106 and the second-detection-value acquiring unit 108 may be included in the server.

In this case, the first detection value acquired from the photographic pixel group 102 and the second detection value acquired from the phase-difference detection pixel group 104 are output to the server via the network and are gain-adjusted. Subsequently, first control values and second control values are calculated at the setting unit 118. The calculated control values are output to the imaging apparatus, and the focusing lens 12 and the diaphragm 14 are driven based on these control values.

Furthermore, although the above embodiment relates to an example in which the phase-difference detection pixel group 18 is used as a second pixel group, the present technology is not limited to this example. For example, the second pixel group may be a pixel group that captures an image with a depth of field that is different from that of an image captured by the first pixel group. Specifically, microlenses with different focal lengths may be provided respectively for the first pixel group and the second pixel group, so that images with different depths of field can be acquired by the first pixel group and the second pixel group. Accordingly, pixel groups for various purposes can be employed as the second pixel group, so that the versatility of the second pixel group can be enhanced.

The advantages discussed in this specification are strictly for descriptive or exemplary purposes and are not to be limitative. In other words, in addition to or in place of the above-described advantages, the technology according to the present disclosure may exhibit other advantages that are obvious to those skilled in the art from this specification.

Additionally, the present technology may also be configured as below.

(1) A control device including
a control unit configured to perform exposure control of a first pixel group and exposure control of a second pixel group independently of each other, the first pixel group and the second pixel group being disposed in a single imaging surface,
wherein the control unit controls gain or an exposure time of the first pixel group and gain or an exposure time of the second pixel group independently of each other.

(2) The control device according to (1),
wherein the first pixel group is a photographic pixel group, and the second pixel group is a phase-difference detection pixel group.

(3) The control device according to (1) or (2),
wherein the control unit sets at least one of an interlocking range of second gain and an interlocking range of a second exposure time of the second pixel group to be wider than an interlocking range of first gain or a first exposure time of the first pixel group.

(4) The control device according to (3),
wherein the control unit sets the second gain or the second exposure time independently of an exposure mode set for an image acquired by the first pixel group.

(5) The control device according to any one of (1) to (4),
wherein when an exposure correction value set by a user is input, the control unit corrects first gain or a first exposure time of the first pixel group based on the exposure correction value, and corrects only a correctable value of second gain or a second exposure time of the second pixel group based on the exposure correction value.

(6) The control device according to any one of (3) to (5),
wherein the control unit corrects the second gain or the second exposure time based on a predetermined set value of a diaphragm set by a user.

(7) The control device according to (6),
wherein when the set value of the diaphragm is temporarily set in a reducing direction by the user, the control unit extends the second gain or increases the second exposure time.

(8) The control device according to any one of (1) to (7),
wherein the control unit sets an amount of change in first luminance and an amount of change in second luminance, the amount of change in first luminance causing first gain or a first exposure time of the first pixel group to follow a target value for the first gain or the first exposure time, the amount of change in second luminance causing second gain or a second exposure time of the second pixel group to follow a target value for the second gain or the second exposure time, and
wherein the amount of change in second luminance is set to be larger than the amount of change in first luminance.

(9) The control device according to (8),
wherein an upper limit value is not set for the amount of change in second luminance.

(10) The control device according to any one of (3) to (9), further including:
a first-gain control unit configured to perform gain control of a detection value of the first pixel group based on the first gain and to output a first detection value;
a second-gain control unit configured to perform gain control of a detection value of the second pixel group based on the second gain independently of the first-gain control unit and to output a second detection value;
a first-timing control unit configured to perform exposure control of the first pixel group based on the first exposure time; and
a second-timing control unit configured to perform exposure control of the second pixel group based on the second exposure time independently of the first-timing control unit,
wherein the control unit includes
a first-control-value arithmetic unit configured to calculate the first gain and the first exposure time, and
a second-control-value arithmetic unit configured to calculate the second gain and the second exposure time,
wherein the first-control-value arithmetic unit calculates the first gain, the first exposure time, and a set value of a diaphragm based on the first detection value and lens information, and
wherein the second-control-value arithmetic unit calculates the second gain and the second exposure time based on the second detection value and the set value of the diaphragm calculated by the first-control-value arithmetic unit.

(11) The control device according to (10),
wherein the control unit calculates gain and an exposure time of the first pixel group and gain and an exposure time of the second pixel group in accordance with a focus mode included in the lens information,
wherein when the focus mode is an autofocus mode, the set value of the diaphragm is set based on a calculation result obtained by the second-control-value arithmetic unit, and
wherein when the focus mode is a manual focus mode, the first gain, the first exposure time, and the set value of the diaphragm are set based on a condition different from a condition of the autofocus mode, and target values for the second gain and the second exposure time are set to values deviated from the corresponding first gain and the corresponding first exposure time by predetermined amounts.

(12) A control method including:
controlling first gain or a first exposure time of a first pixel group; and
controlling second gain or a second exposure time of a second pixel group independently of the first pixel group, the first pixel group and the second pixel group being disposed in a single imaging surface.

(13) An exposure control system including:
a first pixel group and a second pixel group configured to be disposed in a single imaging surface; and
a control device having a control unit configured to perform exposure control of a first pixel group and exposure control of a second pixel group independently of each other, the control unit controlling gain or an exposure time of the first pixel group and gain or an exposure time of the second pixel group independently of each other.

What is claimed is:

1. A control device comprising:
a control unit configured to perform exposure control of a first pixel group for capturing an image and exposure control of a second pixel group for detecting phase difference independently of each other, the first pixel group and the second pixel group being disposed in a single imaging surface,
wherein the control unit controls gain of the second pixel group higher than the first pixel group, or controls exposure time of the second pixel group longer than the first pixel group,
wherein the control unit is configured to correct the gain or the exposure time of the first pixel group based on a correction value input by a user, and a correction of the gain or the exposure time of the first pixel group is different from a correction of the gain or the exposure time of the second pixel group, and
wherein when an exposure correction value set by a user is input, the control unit corrects first gain or a first exposure time of the first pixel group based on the exposure correction value, and corrects only a correctable value of second gain or a second exposure time of the second pixel group based on the exposure correction value.

2. The control device according to claim 1,
wherein the first pixel group is a photographic pixel group, and the second pixel group is a phase-difference detection pixel group.

3. An exposure control system comprising:
the control device according to claim 1;
the first pixel group; and
the second pixel group.

4. A control device comprising:
a control unit configured to perform exposure control of a first pixel group and exposure control of a second pixel group independently of each other, the first pixel group and the second pixel group being disposed in a single imaging surface,
wherein the control unit controls gain or an exposure time of the first pixel group and gain or an exposure time of the second pixel group independently of each other,
wherein the control unit sets at least one of an interlocking range of second gain and an interlocking range of a second exposure time of the second pixel group to be wider than an interlocking range of first gain or a first exposure time of the first pixel group.

5. The control device according to claim 4,
wherein the control unit sets the second gain or the second exposure time independently of an exposure mode set for an image acquired by the first pixel group.

6. The control device according to claim 4,
wherein the control unit corrects the second gain or the second exposure time based on a predetermined set value of a diaphragm set by a user.

7. The control device according to claim 6,
wherein when the set value of the diaphragm is temporarily set in a reducing direction by the user, the control unit extends the second gain or increases the second exposure time.

8. The control device according to claim 4, further comprising:
a first-gain control unit configured to perform gain control of a detection value of the first pixel group based on the first gain and to output a first detection value;
a second-gain control unit configured to perform gain control of a detection value of the second pixel group based on the second gain independently of the first-gain control unit and to output a second detection value;
a first-timing control unit configured to perform exposure control of the first pixel group based on the first exposure time; and
a second-timing control unit configured to perform exposure control of the second pixel group based on the second exposure time independently of the first-timing control unit,
wherein the control unit includes
a first-control-value arithmetic unit configured to calculate the first gain and the first exposure time, and
a second-control-value arithmetic unit configured to calculate the second gain and the second exposure time,
wherein the first-control-value arithmetic unit calculates the first gain, the first exposure time, and a set value of a diaphragm based on the first detection value and lens information, and
wherein the second-control-value arithmetic unit calculates the second gain and the second exposure time based on the second detection value and the set value of the diaphragm calculated by the first-control-value arithmetic unit.

9. The control device according to claim 8,
wherein the control unit calculates gain and an exposure time of the first pixel group and gain and an exposure time of the second pixel group in accordance with a focus mode included in the lens information,
wherein when the focus mode is an autofocus mode, the set value of the diaphragm is set based on a calculation result obtained by the second-control-value arithmetic unit, and
wherein when the focus mode is a manual focus mode, the first gain, the first exposure time, and the set value of the diaphragm are set based on a condition different from a condition of the autofocus mode, and target values for the second gain and the second exposure time are set to values deviated from the corresponding first gain and the corresponding first exposure time by predetermined amounts.

10. An exposure control system comprising:
the control device according to claim 4;
the first pixel group; and
the second pixel group.

11. A control device comprising:
a control unit configured to perform exposure control of a first pixel group and exposure control of a second pixel group independently of each other, the first pixel group and the second pixel group being disposed in a single imaging surface,
wherein the control unit controls gain or an exposure time of the first pixel group and gain or an exposure time of the second pixel group independently of each other,
wherein the control unit sets an amount of change in first luminance and an amount of change in second luminance, the amount of change in first luminance causing first gain or a first exposure time of the first pixel group to follow a target value for the first gain or the first exposure time, the amount of change in second luminance causing second gain or a second exposure time of the second pixel group to follow a target value for the second gain or the second exposure time, and
wherein the amount of change in second luminance is set to be larger than the amount of change in first luminance.

12. The control device according to claim 11, wherein an upper limit value is not set for the amount of change in second luminance.

13. An exposure control system comprising:
the control device according to claim 11;
the first pixel group; and
the second pixel group.

14. A control method comprising:
controlling first gain or a first exposure time of a first pixel group; and
controlling second gain or a second exposure time of a second pixel group independently of the first pixel group, the first pixel group and the second pixel group being disposed in a single imaging surface,
wherein when an exposure correction value set by a user is input, a control unit corrects first gain or a first exposure time of the first pixel group based on the exposure correction value, and corrects only a correctable value of second gain or a second exposure time of the second pixel group based on the exposure correction value.

15. A control method comprising:
controlling first gain or a first exposure time of a first pixel group; and
controlling second gain or a second exposure time of a second pixel group independently of the first pixel group, the first pixel group and the second pixel group being disposed in a single imaging surface,
wherein a control unit sets at least one of an interlocking range of second gain and an interlocking range of a second exposure time of the second pixel group to be wider than an interlocking range of first gain or a first exposure time of the first pixel group.

16. A control method comprising:
controlling first gain or a first exposure time of a first pixel group; and
controlling second gain or a second exposure time of a second pixel group independently of the first pixel group, the first pixel group and the second pixel group being disposed in a single imaging surface,
wherein the control unit sets an amount of change in first luminance and an amount of change in second luminance, the amount of change in first luminance causing first gain or a first exposure time of the first pixel group to follow a target value for the first gain or the first exposure time, the amount of change in second luminance causing second gain or a second exposure time of the second pixel group to follow a target value for the second gain or the second exposure time, and
wherein the amount of change in second luminance is set to be larger than the amount of change in first luminance.

* * * * *